(12) United States Patent
Handelman

(10) Patent No.: US 6,654,721 B2  
(45) Date of Patent: Nov. 25, 2003

(54) VOICE ACTIVATED COMMUNICATION SYSTEM AND PROGRAM GUIDE

(75) Inventor: Doron Handelman, Givatavim (IL)

(73) Assignee: News Datacom Limited, Middlesex (GB)

(*) Notice: Subject to any disclaimer, the term of this patent is extended or adjusted under 35 U.S.C. 154(b) by 0 days.

(21) Appl. No.: 09/933,097

(22) Filed: Aug. 20, 2001

(65) Prior Publication Data

US 2002/0052746 A1 May 2, 2002

Related U.S. Application Data

(62) Division of application No. 08/991,972, filed on Dec. 17, 1997, now abandoned.

(30) Foreign Application Priority Data

Dec. 31, 1996 (IL) ................................................ 119948

(51) Int. Cl.⁷ .......................... G10L 17/00; G06F 13/10
(52) U.S. Cl. ...................... 704/270; 704/275; 704/273; 382/115; 725/39
(58) Field of Search ................................ 704/270, 275, 704/271, 272, 276, 273; 725/38, 39; 382/181, 219, 229, 115

(56) References Cited

U.S. PATENT DOCUMENTS

| | | | |
|---|---|---|---|
| 3,946,157 A | 3/1976 | Dreyfus | 179/1 |
| 4,706,121 A | 11/1987 | Young | 358/142 |
| 4,718,092 A | 1/1988 | Klovstad | 381/43 |
| 4,757,541 A | 7/1988 | Beadles | 381/43 |
| 4,827,518 A | 5/1989 | Feuster et al. | 381/42 |
| 4,891,602 A | 1/1990 | Strehler | 381/45 |
| 4,907,079 A | 3/1990 | Turner et al. | 348/2 |
| 4,961,229 A | 10/1990 | Takahashi | 381/42 |
| 4,975,960 A | 12/1990 | Petajan | 381/43 |

(List continued on next page.)

FOREIGN PATENT DOCUMENTS

WO  9816062  4/1988

OTHER PUBLICATIONS

Visionics Corporation of Metuchen, NJ, "Vision System Finds Faces in a Crowd", The Laser Focus Magazine, Nov. 1996, pp. 52–56.

(List continued on next page.)

*Primary Examiner*—Tālivaldis Ivars Šmits  
*Assistant Examiner*—Abul K. Azad  
(74) *Attorney, Agent, or Firm*—Ladas & Parry

(57) ABSTRACT

A subscriber unit for use with a program guide selection system is described. The program guide selection system provides program guide information which is communicated over a communication network and includes operating characteristics of a communication system and selection codes which are associated with the operating characteristics of the communication system. The subscriber unit includes: a receiver for receiving the program guide information and the selection codes associated with the operating characteristics, a display for displaying the program guide information and the selection codes to a subscriber, a microphone which is employed by the subscriber, when the subscriber identifies on the display a selection code which is associated with a requested one of the operating characteristics, to orally input a voice expression which includes the selection code, and a speech recognition unit which is coupled to the microphone and is operative to enable selection of the requested one of the operating characteristics in response to the voice expression.

31 Claims, 14 Drawing Sheets

U.S. PATENT DOCUMENTS

| | | | |
|---|---|---|---|
| 5,027,149 A | 6/1991 | Hoshino et al. | 354/412 |
| 5,086,385 A | 2/1992 | Launey et al. | 364/188 |
| 5,163,111 A | 11/1992 | Baji et al. | 395/22 |
| 5,199,080 A | 3/1993 | Kimura et al. | 381/110 |
| 5,226,090 A | 7/1993 | Kimura | 381/110 |
| 5,280,575 A | 1/1994 | Young et al. | 707/504 |
| 5,583,560 A | 12/1996 | Florin et al. | 348/7 |
| 5,729,659 A | 3/1998 | Potter | 704/270 |
| 5,774,859 A | 6/1998 | Houser et al. | 704/275 |
| 5,832,439 A | 11/1998 | Cox, Jr. et al. | 704/275 |
| 5,842,168 A | 11/1998 | Miyazawa et al. | 704/275 |
| 6,070,139 A | 5/2000 | Miyazawa et al. | 704/275 |

OTHER PUBLICATIONS

Kai Fu Lee, "Automatic Speech Recognition, the Development of the Sphinx System", Kluwer Academic Publishers, pp. 1–5.

"Digital Speech Processing, Synthesis, and Recognition", by Sadaoki Fururi, Marcel Dekker, Inc. Publishing, in Chapter 8.

"Automatic Speech & Speaker Recognition", N. Rex Dixon, Thomas B. Martin, IEEE Press, New York, 1978.

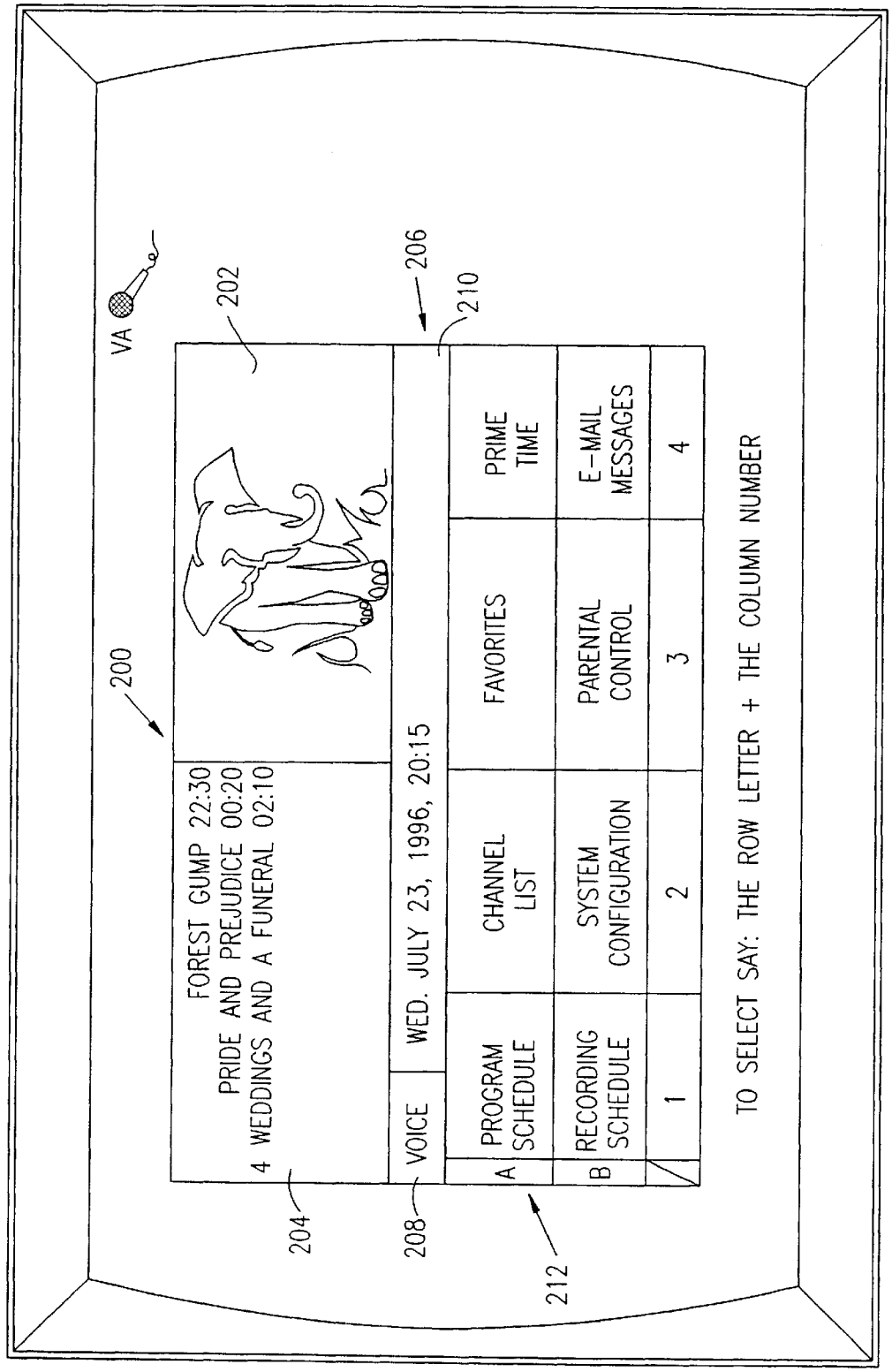

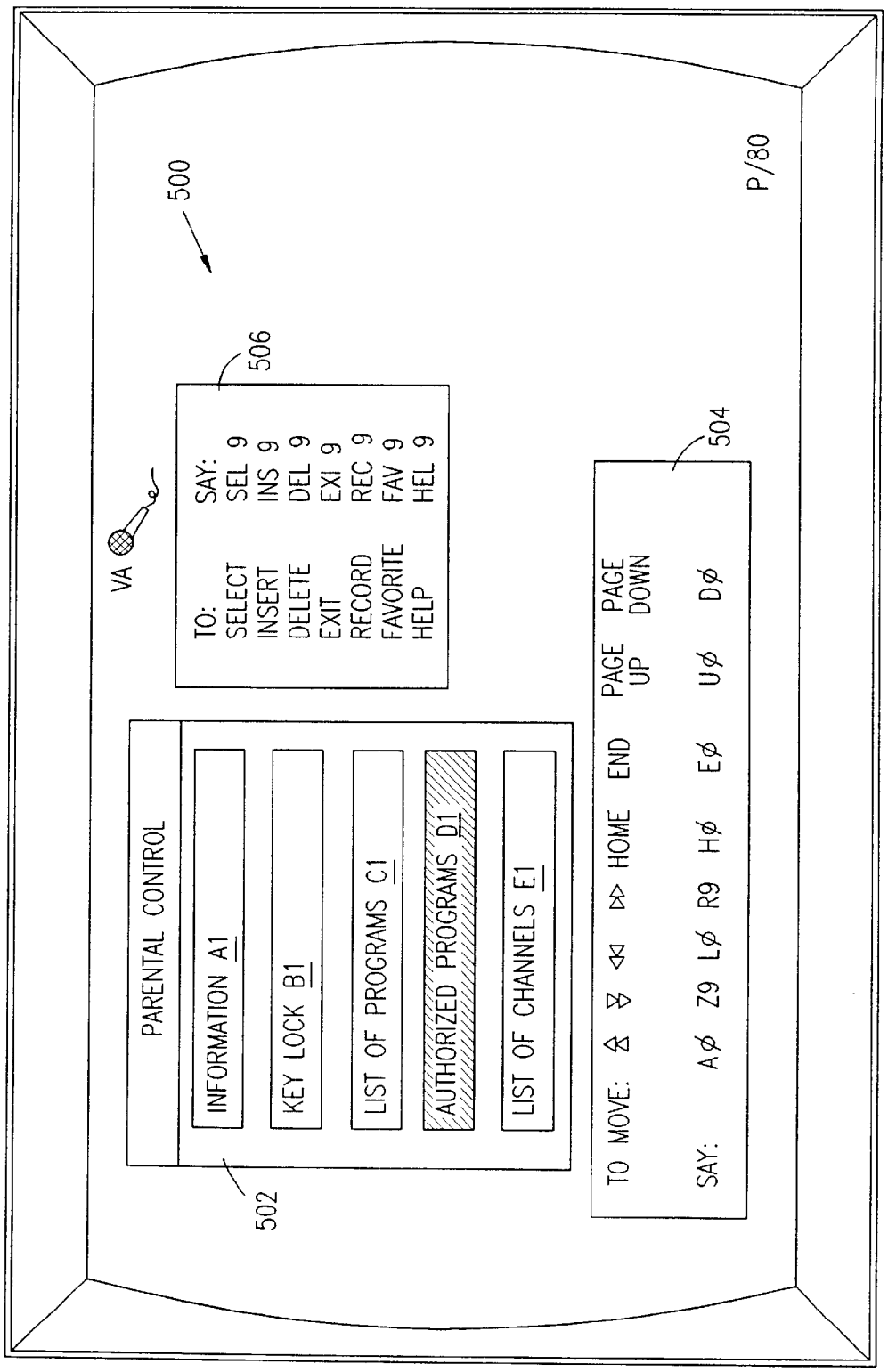

VOICE ACTIVATED COMMUNICATION SYSTEM AND PROGRAM GUIDE

This application is a divisional of application Ser. No. 08/991,972 filed on Dec. 17, 1997, ABN was published in English, claims the benefit thereof and incorporates the same by reference.

FIELD OF THE INVENTION

The present invention relates to communication systems generally and more particularly to television and pay television systems and to methods and devices which are employed to operate various functions in television and pay television systems.

BACKGROUND OF THE INVENTION

There are known in the art voice activation devices which are used to activate various apparatus and systems. Typically, the voice activation devices are employed to turn on and off an appliance, such as a lighting system, a security system and a personal terminal.

U.S. Pat. Nos. 5,199,080 and 5,226,090 describe a voice-operated remote control system which transmits a remote control signal in response to a voice command. The remote control of U.S. Pat. No. 5,199,080 has a speech recognition circuit for recognizing the voice command. The remote control system of U.S. Pat. No. 5,226,090 further includes a detector for detecting whether a voice command is received or not.

U.S. Pat. No. 5,163,111 describes a customized personal terminal device which is capable of operating in response to input data peculiar to the operator and comprises a speech recognition unit for recognizing inputted speech, an image recognition unit for recognizing inputted image, and an instruction recognition unit for recognizing an inputted instruction.

U.S. Pat. No. 4,975,960 describes an electronic facial tracking and detection system and method and apparatus for automated speech recognition which includes circuitry for obtaining a video image of an individual's face, circuitry for electronically locating and tracking a first feature, such as the nostrils, of the facial image for use as reference coordinates, and circuitry responsive to the reference coordinates for locating and tracking a second facial feature, such as the mouth, of the facial image with respect to the first feature.

U.S. Pat. No. 5,086,385 describes a system and a method for providing an expandable home automation controller which supports multiple numbers and multiple different types of data communications with both appliances and subsystems within the home as well as systems external to the home. The system allows for the input of commands by a variety of means such as touchscreens, voice recognition systems, telephones, custom switches or any device capable of providing an input to a computer system.

U.S. Pat. No. 5,027,149 describes a voice-recognition camera for taking photographs by voice recognition operations. The camera comprises a microphone through which voiced command words of an operator are registered in a computer as a form of digital data.

U.S. Pat. No. 4,706,121 describes a system which controls a television receiver to allow user selection of broadcast programs from schedule information.

In an article entitled "Vision system finds faces in a crowd" on pages 52–56 in the Laser Focus Magazine of November 1996, a vision system which includes a software called Facelt published by Visionics Corporation of Metuchen, N.J. is described. The system won a competition that was part of a program named FERET which is funded by the U.S. Defense Advanced Research Projects Agency. In the competition various automated face recognition systems were tested using a single database of thousands of faces that includes a wide range of ages races and poses.

Conventional voice recognition systems are described in a book entitled "Automatic Speech Recognition, The Development of the SPHINX System", by Kai-Fu Lee, Kluwer Academic Publishers, on pp. 1–5, and in a book entitled "Digital Speech Processing, Synthesis, and Recognition", by Sadaoki Fururi, Marcel Dekker, Inc. Publishing, in Chapter 8.

The disclosures of all references mentioned above and throughout the specification are incorporated herein by reference.

SUMMARY OF THE INVENTION

The present invention seeks to provide voice activation devices and methods which are employed to operate various functions in entertainment and information communication systems, such as television and pay television systems.

There is thus provided in accordance with a preferred embodiment of the present invention a program guide selection system including:

a communication network for communicating program guide information and selection codes which enable selections of operating characteristics of a communication system from the program guide information, the selection codes being associated with the operating characteristics; and a multiplicity of subscriber units, each including:
a receiver for receiving the program guide information and the selection codes associated with the operating characteristics;
a display for displaying the program guide information and the selection codes to a subscriber;
a microphone which is responsive to a voice expression spoken by the subscriber upon identification, on the display, of a selection code which is associated with a requested one of the operating characteristics, wherein the voice expression includes the selection code; and
a speech recognition unit which is coupled to the microphone and is operative to select the requested one of the operating characteristics in response to the voice expression.

Preferably, the communication network includes at least one of the following: a computer network, a television network, a cable television network, a satellite communication network, a telephone network, and a videophone network.

There is also provided in accordance with a preferred embodiment of the present invention a subscriber unit for use with a program guide selection system in which program guide information is communicated over a communication network, wherein the program guide information includes operating characteristics of a communication system and selection codes which are associated with the operating characteristics of the communication system, the subscriber unit including:

a receiver for receiving the program guide information and the selection codes associated with the operating characteristics;

a display for displaying the program guide information and the selection codes to a subscriber;

a microphone which is responsive to a voice expression spoken by the subscriber upon identification, on the display, of a selection code which is associated with a requested one of the operating characteristics, wherein the voice expression includes the selection code; and a speech recognition unit which is coupled to the microphone and is operative to select the requested one of the operating characteristics in response to the voice expression.

Preferably, the speech recognition unit includes an external removable speech recognition module, the subscriber unit includes an interface unit, and the external removable speech recognition module is operative to select the requested one of the operating characteristics via the interface unit.

Additionally, the subscriber unit may include:

a memory which is coupled to the speech recognition unit and is operative to store speech characteristics of the subscriber, and wherein the speech recognition unit is operative to compare characteristics of the voice expression to the speech characteristics of the subscriber, and to select the requested one of the operating characteristics only when the characteristics of the voice expression substantially matches the speech characteristics of the subscriber.

Preferably, the program guide information is compressed prior to transmission over the communication network, and the subscriber unit includes a compressor/decompressor which is operative to decompress the program guide information, to compress the speech characteristics of the subscriber prior to storage in the memory, and to decompress the speech characteristics of the subscriber upon retrieval from the memory.

In accordance with a preferred embodiment of the present invention there is also provided a program guide selection system including:

a communication network for communicating program guide information and selection codes which enable selections of operating characteristics of a communication system from the program guide information, the selection codes being associated with the operating characteristics; and a multiplicity of subscriber units, each including:

a receiver for receiving the program guide information and the selection codes associated with the operating characteristics;

a microphone which is employed by a subscriber to provide, by speaking, a selection code;

a speech recognition unit which is coupled to the microphone and is customized to respond to the selection codes when spoken by each of multiple speakers in accordance with speech characteristics of each of the multiple speakers;

a camera which is operative to take a picture of the subscriber when located in the field of view of the camera;

a processor which is coupled to the speech recognition unit and is operative to associate the speech characteristics of each of the multiple speakers with images of each of the multiple speakers taken thereof; and an image processor, which is coupled to the camera and to the processor, and is operative to compare the picture of the subscriber to the images of each of the multiple speakers and to determine whether the picture of the subscriber is substantially similar to an image of a speaker, wherein the speech recognition unit is operative, in response to a determination that the picture of the subscriber is substantially similar to the image of the speaker, to select a requested one of the operating characteristics of the communication system associated with the selection code in accordance with a determination by the speech recognition unit that speech characteristics of the subscriber substantially matches speech characteristics associated with the speaker.

Preferably, each of the selection codes includes one of letter characters, number characters, and combination letter and number characters. Additionally, each of the selection codes includes an instruction code associated with an instruction for execution of an operation.

Alternatively or additionally, each of the selection codes includes at least one of words, phrases and sentences. Preferably, each of the selection codes further includes an instruction code associated with an instruction for execution of an operation.

Further, there is also provided in accordance with a preferred embodiment of the present invention a subscriber unit for use with a program guide selection system in which program guide information is communicated over a communication network, wherein the program guide information includes operating characteristics of a communication system and selection codes which are associated with the operating characteristics of the communication system, the subscriber unit including:

a receiver for receiving the program guide information and the selection codes associated with the operating characteristics;

a microphone which is employed by a subscriber to provide, by speaking, a selection code;

a speech recognition unit which is coupled to the microphone and is customized to respond to the selection codes when spoken by each of multiple speakers in accordance with speech characteristics of each of the multiple speakers;

a camera which is operative to take a picture of the subscriber when located in the field of view of the camera;

a processor which is coupled to the speech recognition unit and is operative to associate the speech characteristics of each of the multiple speakers with images of each of the multiple speakers taken thereof; and an image processor, which is coupled to the camera and to the processor, and is operative to compare the picture of the subscriber to the images of each of the multiple speakers and to determine whether the picture of the subscriber is substantially similar to an image of a speaker, wherein the speech recognition unit is operative, in response to a determination that the picture of the subscriber is substantially similar to the image of the speaker, to select a requested one of the operating characteristics of the communication system associated with the selection code in accordance with a determination by the speech recognition unit that speech characteristics of the subscriber substantially matches speech characteristics associated with the speaker.

Additionally, the subscriber unit includes a memory which communicates with at least one of the processor, the speech recognition unit, and the image processor, wherein the memory is operative to store at least one of the speech characteristics of each of the multiple speakers and the images of each of the multiple speakers.

Preferably, the memory includes a removable external memory module, the subscriber unit includes an external memory reader, and the removable external memory module communicates with the at least one of the processor, the speech recognition unit, and the image processor via the external memory reader.

In a preferred embodiment of the present invention the speech recognition unit includes an external removable speech recognition module, the subscriber unit includes an interface unit, and the external removable speech recognition module is operative to select the requested one of the operating characteristics via the interface unit.

Additionally, the subscriber unit includes an on-screen-display (OSD) unit which is operative to insert on-screen messages in response to instructions provided by at least one of the speech recognition unit and the processor.

Preferably, the subscriber unit includes a decrypter which is operative to decrypt encrypted incoming information in response to an authorization signal provided by at least one of the speech recognition unit and the processor.

Additionally, the subscriber unit includes a compressor/decompressor which is operative to compress the at least one of the speech characteristics of each of the multiple speakers and the images of each of the multiple speakers prior to storage in the memory, and to decompress the at least one of the speech characteristics of each of the multiple speakers and the images of each of the multiple speakers upon retrieval from the memory.

In accordance with a preferred embodiment of the present invention there is also provided a subscriber unit for use with a program guide selection system in which program guide information is communicated over a communication network, wherein the program guide information includes operating characteristics of a communication system, the subscriber unit including:

a receiver for receiving the program guide information including the operating characteristics;

a memory for storing selection codes which enable selections from the operating characteristics;

a processor for associating the selection codes with the operating characteristics;

a display for displaying the program guide information and the selection codes to a subscriber;

a microphone which is responsive to a voice expression spoken by the subscriber upon identification, on the display, of a selection code which is associated with a requested one of operating characteristics, wherein the voice expression includes the selection code; and a speech recognition unit which is coupled to the microphone and is operative to select the requested one of the operating characteristics in response to the voice expression.

Further in accordance with a preferred embodiment of the present invention there is provided a subscriber unit for use with a program guide selection system in which program guide information is communicated over a communication network, wherein the program guide information includes operating characteristics of a communication system, the subscriber unit including:

a receiver for receiving the program guide information including the operating characteristics;

a microphone which is responsive to speech;

a memory for storing selection codes which enable selections from the operating characteristics, speech characteristics of each of multiple speakers, and images of each of the multiple speakers taken thereof;

a camera which is operative to take a picture of a subscriber when located in the field of view of the camera;

a processor which is operative to associate the selection codes with the operating characteristics, and to associate the speech characteristics of each of the multiple speakers with the images of each of the multiple speakers;

an image processor, which is coupled to the camera, to the processor and to the memory and is operative to compare the picture of the subscriber to the images of each of the multiple speakers and to determine whether the picture of the subscriber is substantially similar to an image of a speaker; and a speech recognition unit which is coupled to the microphone, to the processor and to the memory and is operative, in response to a determination that the picture of the subscriber is substantially similar to the image of the speaker, to select a requested one of the operating characteristics of the communication system in response to a selection code spoken by the subscriber via the microphone and in accordance with a determination, by the speech recognition unit, that speech characteristics of the subscriber substantially matches speech characteristics associated with the speaker.

There is also provided in accordance with a preferred embodiment of the present invention a determination system for determining, from among a plurality of viewers of a communication system, a viewer who is exclusively authorized to select a requested one of operating characteristics of the communication system, the determination system including:

a camera which is operative to take a picture of the viewer when located in the field of view of the camera; and an image processor which is coupled to the camera and is operative to compare the picture of the viewer to stored images of the plurality of viewers, to determine whether the picture of the viewer is substantially similar to one of the stored images, and to exclusively authorize the viewer to select the requested one of the operating characteristics of the communication system in response to a determination that the picture of the viewer is substantially similar to one of the stored images.

In accordance with a preferred embodiment of the present invention there is provided a voice selection method for enabling a user to select a requested one of operating characteristics of a communication system from a plurality of the operating characteristics of the system which are displayed on a display, the method including:

associating each one of the plurality of the operating characteristics with a selection code;

displaying at least some of the plurality of the operating characteristics and selection codes associated therewith on the display;

identifying, on the display, a requested selection code which corresponds to the requested one of the operating characteristics;

saying a voice expression which includes the requested selection code; and selecting the requested one of the operating characteristics in response to the voice expression.

Preferably, the selecting step includes:

detecting the voice expression which includes the requested selection code;

verifying that the requested selection code is a legitimate code which is associated with a legitimate selection of one of the operating characteristics; and executing a selection of the requested one of the operating characteristics in response to the verifying step.

Further, the verifying step also includes the step of recognizing the user as an authorized operator, and the executing step includes executing a selection of the requested one of the operating characteristics in response to verification of the requested selection code and to the recognizing step.

Preferably, the step of saying a voice expression which includes the requested selection code includes:

saying the requested selection code; and saying an instruction code associated with an instruction for execution of an operation following the step of saying the requested selection code.

Further preferably, each selection code includes at least a letter character and a number character, and the step of saying a voice expression includes sequentially saying the letter character and the number character in any order thereof.

There is also provided in accordance with a preferred embodiment of the present invention a voice selection method for selecting a requested one of operating characteristics of a communication system from a plurality of the operating characteristics of the system, the method including:

arranging the plurality of the operating characteristics of the system in a two-dimensional table having cells defined by rows, which are each associated with a separate character from a first series of characters, and by columns, which are each associated with a separate character from a second series of characters;

displaying, on a display, the two-dimensional table, the characters associated with the rows, and the characters associated with the columns;

identifying a cell which corresponds to the requested one of the operating characteristics;

recognizing a row and a column which define the cell;

saying a voice expression which includes sequentially saying a character which is associated with the row and a character which is associated with the column in any order thereof; and selecting the requested one of the operating characteristics in response to the voice expression.

Preferably, the first series of characters includes letter characters, the second series of characters includes number characters, and the step of saying a voice expression includes sequentially saying a letter character which is associated with the row and a number character which is associated with the column in any order thereof.

Alternatively, the first series of characters and the second series of characters include letter characters, and the step of saying a voice expression includes sequentially saying a letter character which is associated with the row and a letter character which is associated with the column in any order thereof.

Further alternatively, the first series of characters and the second series of characters include number characters, and the step of saying a voice expression includes sequentially saying a number character which is associated with the row and a number character which is associated with the column in any order thereof.

In accordance with another preferred embodiment of the present invention there is also provided a voice selection method for selecting a requested one of operating characteristics of a communication system from a plurality of the operating characteristics of the system, the method including:

arranging the plurality of the operating characteristics of the system in a one-dimensional table having cells defined by rows which are each associated with a separate character from a series of characters;

displaying, on a display, the one-dimensional table and the characters associated with the rows;

identifying a cell which corresponds to the requested one of the operating characteristics;

recognizing a row that defines the cell;

saying a voice expression which includes a character that is associated with the row; and selecting the requested one of the operating characteristics in response to the voice expression.

Preferably, the series of characters includes one of letter characters, number characters, and combination letter and number characters.

In accordance with yet another preferred embodiment of the present invention there is provided a voice selection method for selecting a requested one of operating characteristics of a communication system from a plurality of the operating characteristics of the system which are displayed on a display, the method including:

arranging the plurality of the operating characteristics of the system in a display screen having pre-positioned selection areas which are each associated with a selection code from a series of codes;

displaying, on the display, the screen having pre-positioned selection areas and the series of codes associated with the selection areas;

identifying an area which corresponds to the requested one of the operating characteristics;

recognizing a requested selection code which is associated with the area;

saying a voice expression which includes the requested selection code which is associated with the area; and selecting the requested one of the operating characteristics in response to the voice expression.

Preferably, the step of saying a voice expression which includes the requested selection code includes:

saying the requested selection code; and saying an instruction code associated with an instruction for execution of an operation following the step of saying the requested selection code.

There is also provided in accordance with a preferred embodiment of the present invention a voice selection method for enabling a user to select a requested one of operating characteristics of a communication system from a plurality of the operating characteristics of the system which are displayed on a display, the method including:

providing a speech recognition unit which is operative to respond to speech from multiple speakers;

storing speech characteristics of each of the multiple speakers;

associating the speech characteristics of each of the multiple speakers with images of each of the multiple speakers taken thereof;

providing a camera which is operative to take a picture of the user when located in the field of view of the camera;

comparing the picture of the user to the images of the multiple speakers;

determining that the picture of the user is substantially similar to an image of a speaker; and executing, in response to the determining step and in accordance with a determination, by the speech recognition unit, that speech characteristics of the user substantially matches speech characteristics associated with the speaker, a voice command which is spoken by the user only and is associated with the requested one of the operating characteristics.

Preferably, the executing step includes:

detecting the voice command spoken by the user;

verifying that the voice command is a legitimate command which is associated with a selection of the requested one of the operating characteristics; and selecting the requested one of the operating characteristics in response to the verifying step.

In accordance with a preferred embodiment of the present invention there is further provided a voice selection method for enabling a user to select a requested one of operating characteristics of a communication system from a plurality of the operating characteristics of the system which are displayed on a display, the method including:

receiving the plurality of the operating characteristics;

storing selection codes which enable selections from the plurality of the operating characteristics;

associating the plurality of the operating characteristics with the selection codes;

displaying the plurality of the operating characteristics and the selection codes associated therewith to a subscriber;

identifying, on the display, a requested selection code which corresponds to the requested one of the operating characteristics;

saying a voice expression which includes the requested selection code; and selecting the requested one of the operating characteristics in response to the voice expression.

There is also provided in accordance with a preferred embodiment of the present invention a voice selection method for enabling a user to select a requested one of operating characteristics of a communication system from a plurality of operating characteristics of the system which are displayed on a display, the method including:

receiving the plurality of the operating characteristics;

storing selection codes which enable selections from the plurality of the operating characteristics, speech characteristics of each of multiple speakers, and images of each of the multiple speakers taken thereof;

associating the selection codes with the plurality of the operating characteristics;

associating the speech characteristics of each of the multiple speakers with the images of each of the multiple speakers;

taking a picture of a subscriber when located in the field of view of the camera;

comparing the picture of the subscriber to the images of the multiple speakers;

determining that the picture of the subscriber is substantially similar to an image of a speaker;

providing a microphone via which the subscriber speaks a selection code;

determining that speech characteristics associated with the selection code as spoken by the subscriber substantially matches speech characteristics associated with the speaker; and selecting a requested one of the operating characteristics of the communication system which is associated with the selection code in response to determination that the picture of the subscriber is substantially similar to the image of the speaker, and in response to determination that the speech characteristics associated with the selection code as spoken by the subscriber substantially matches the speech characteristics associated with the speaker.

In accordance with another preferred embodiment of the present invention there is provided a method of determining a viewer who is exclusively authorized to select a requested one of operating characteristics of a communication system from among a plurality of viewers of the communication system, the method including:

providing a camera which is operative to take a picture of the viewer when located in the field of view of the camera;

comparing the picture of the viewer to stored images of the plurality of viewers;

determining that the picture of the viewer is substantially similar to one of the stored images; and exclusively authorizing the viewer to select the requested one of the operating characteristics of the communication system in response to the determining step.

BRIEF DESCRIPTION OF THE DRAWINGS

The present invention will be understood and appreciated more fully from the following detailed description, taken in conjunction with the drawings in which:

FIGS. 5A–5I are generalized illustrations of selection screens in a voice activated program guide which is operative with the system of FIG. 1, and is constructed and operative in accordance with a preferred embodiment of the present invention.

DETAILED DESCRIPTION OF PREFERRED EMBODIMENTS

Figure 1:
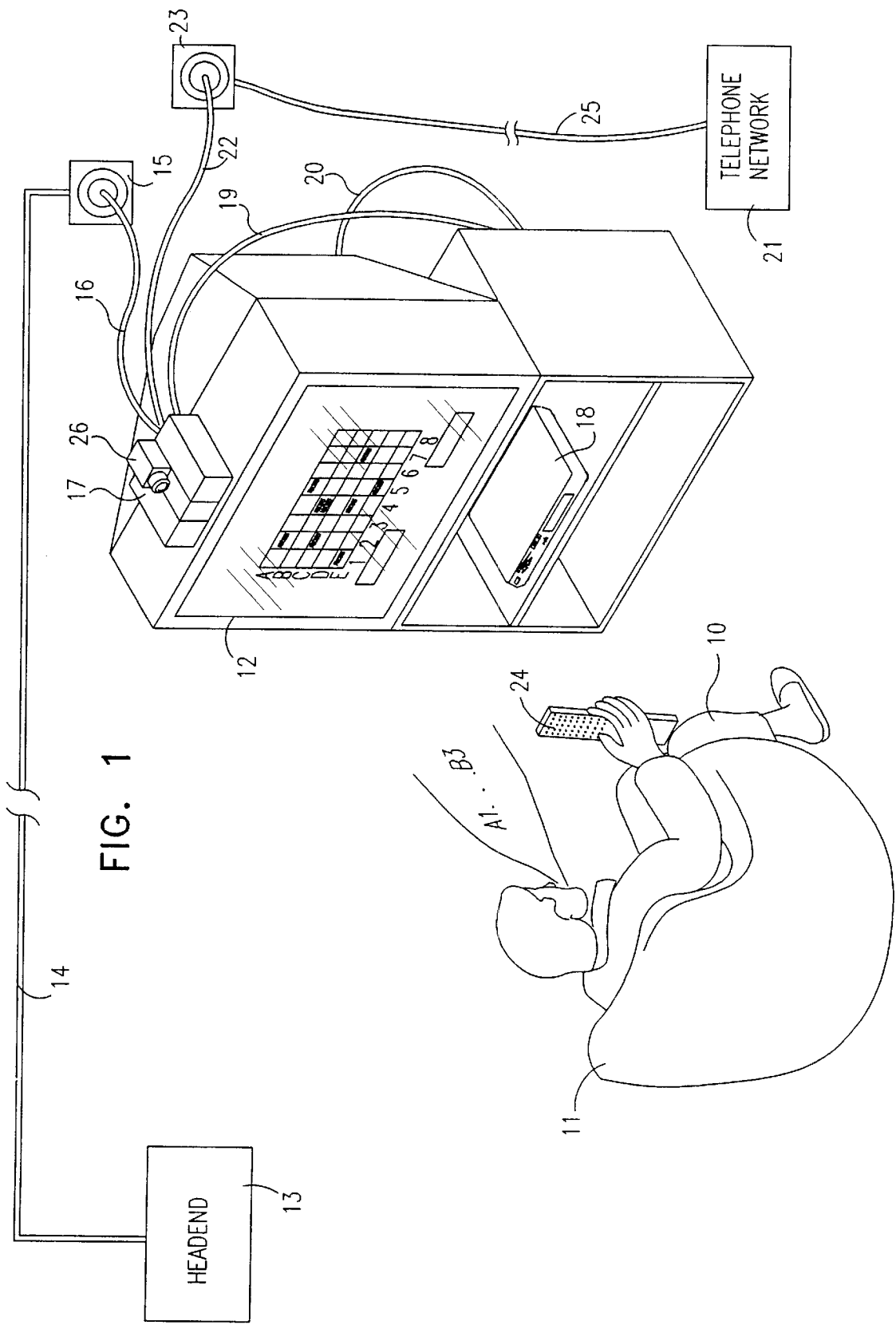
FIG. 1 is a partial pictorial partial block diagram illustration showing the structure and functionality of a preferred implementation of a voice activated communication and entertainment system which includes a televisions the system being constructed and operative in accordance with a preferred embodiment of the present invention.

Reference is now made to FIG. 1, which is a simplified illustration showing the structure and functionality of a voice activated entertainment system constructed and operative in accordance with a preferred embodiment of the present invention.

A user 10, sits on an armchair 11 and watches a program which is provided via a communication network and is displayed on a television 12. The program is preferably transmitted from a headend 13, and is typically supplied to subscribers over-the-air or over cables 14. In both cases, however, transmissions are typically supplied to a wall outlet 15, and user 10 plugs in to wall outlet 15 to receive the transmissions.

It is to be appreciated that the present invention is particularly useful with a pay television network. However, the invention is not to be limited by the nature of the network, rather any network that is configured to distribute a plurality of multimedia programs to a multiplicity of users may be suitable, such as a computer network, a television network, a satellite communication network, a telephone network, a videophone network and any combination thereof.

The terms "pay television" and "CATV" (Community Antenna Television) are interchangeably used through the specification and claims in conjunction with systems and networks. Pay television and CATV are also used in the specification and claims in a broad sense to include one-way and two-way cable television as well as satellite television, CATV, and pay television generally. Two-way cable television may include telephone links for two-way communication between subscribers and a headend.

In a preferred embodiment of the present invention the communication network is a combined radio-frequency (RF) telephone two-way pay television network, in which downlink transmissions are provided over cables 14, which are coaxial cables, and uplink transmissions are provided over telephone.

Preferably, the program is a pay television program which may include a regular television or CATV program, a pay-per-view (PPV) television program, or program schedule information which is part of a program guide as described below. User 10, which is also referred to herein as a pay television subscriber, may view the program or view the program schedule information and make selections thereof as described below.

Typically, the pay television program is received and decoded in a CATV converter 17, which is coupled, via a coaxial cable 16, to wall outlet 15. CATV converter 17 is preferably also coupled to a video-cassette-recorder (VCR) 18 by means of a coaxial cable 19. It is to be appreciated that VCR 18 may be any type of video signal recorder such as an analog VCR which operates with magnetic tapes, or a digital VCR, also known as DVD which operates with optical or magneto-optical disks. Preferably, VCR 18 is coupled to television 12 via a coaxial cable 20.

The terms "encode" and "decode" in all of their forms are used throughout the specification and claims in a broad sense to cover all forms of data encoding and decoding, ranging from simple scrambling and descrambling or encoding and decoding to hard encryption and decryption respectively.

In a preferred embodiment of the present invention CATV decoder 17 is also coupled, via a built-in modem (not shown in FIG. 1) and telephone wires 22, to a telephone wall outlet 23. Telephone wall outlet 23 is coupled to a telephone network 21 via telephone wires 25. The modem is employed to provide the above mentioned uplink transmissions.

Preferably, subscriber 10 holds a remote control unit 24 which is employed to control operation of at least one of television 12, CATV converter 17 and VCR 18. It is to be appreciated that remote control 24 may be either a universal remote control which is programmed to control the operation of all three units, i.e. television 12, CATV converter 17 and VCR 18, or a customized remote control which operates only one of television 12, CATV converter 17 and VCR 18.

In a preferred embodiment of the present invention remote control unit 24 is a voice activated remote control which is employed to control the operation of at least one of television 12, CATV converter 17 and VCR 18. Such a voice activated remote control unit is described in U.S. Pat. No. 5,199,080.

Preferably, a camera 26 is attached to CATV converter 17 and is mounted thereon. Camera 26 may be a video camera or a digital photo camera which takes stills or frozen pictures, and may be placed in a position to generally face subscriber 10.

In a preferred embodiment of the present invention CATV converter 17 may be voice activated under control of camera 26, so that when the face of the subscriber is in a frame of video camera 26, a recognition system (not shown in FIG. 1) which is built in CATV converter 17, recognizes the subscriber, and allows voice commands of the subscriber only to be executed. The functionality of such a recognition system and of camera 26 are described hereinafter with reference to FIG. 2.

Figure 2:
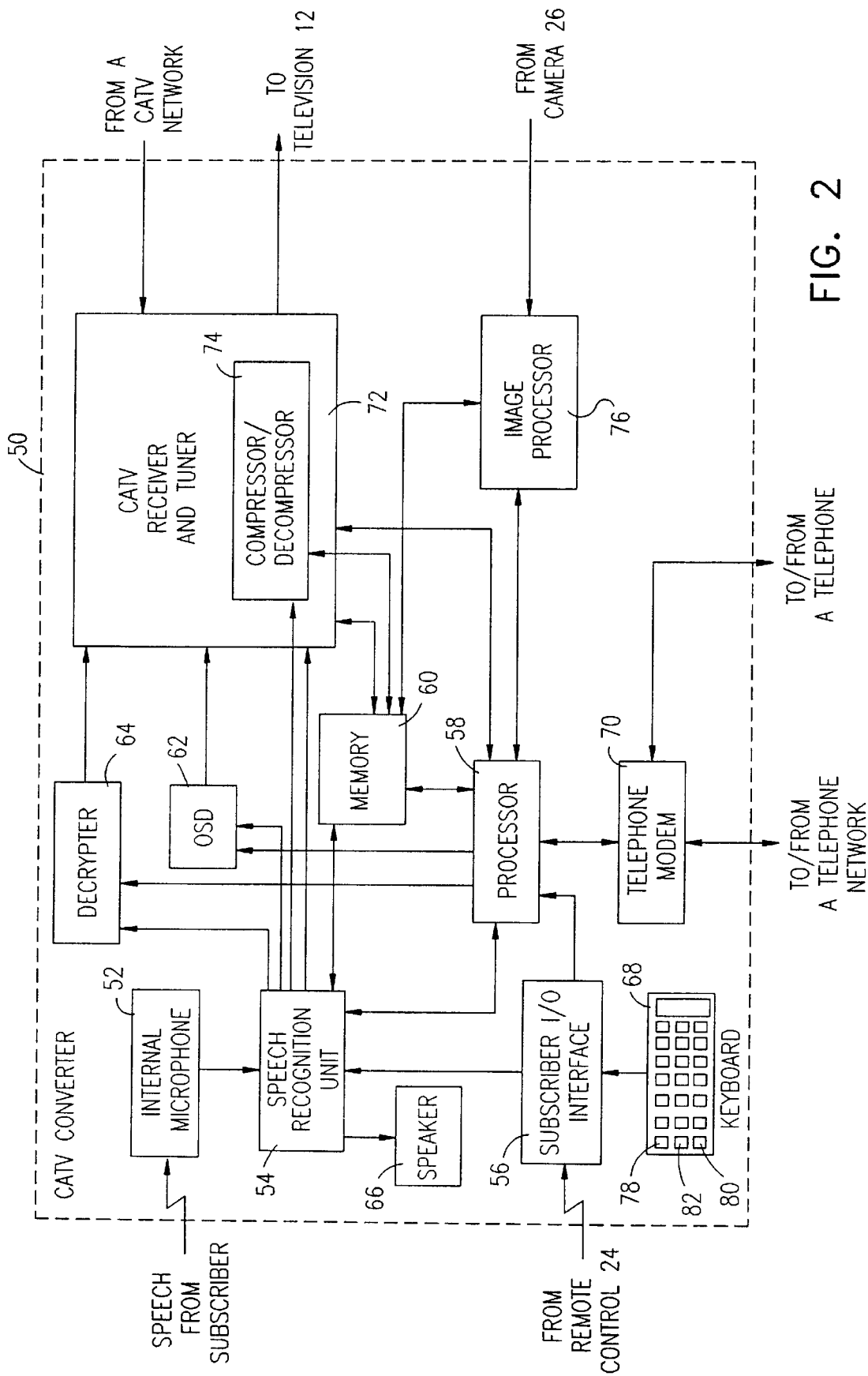
FIG. 2 is a generalized block diagram illustration of a CATV converter which forms part of the communication system of FIG. 1 and is constructed and operative in accordance with a preferred embodiment of the present invention.

Reference is now made to FIG. 2 which is a generalized block diagram illustration of a CATV converter 50 that is operative with the communication system of FIG. 1. CATV converter 50 is similar in functionality and structure to CATV converter 17 of FIG. 1.

Preferably, CATV converter 50 may process voice selections of a subscriber and voice commands and instructions inputted by the subscriber. The subscriber may employ a voice activated remote control (not shown in FIG. 2), such as voice activated remote control 24 of FIG. 1 which structure and functionality may be similar to those described in U.S. Pat. Nos. 5,199,080 and 5,226,090. It is to be appreciated that the subscriber may operate the remote control by speaking toward a microphone (not shown) which is built in the remote control.

In an alternative preferred embodiment of the present invention, the subscriber may speak toward a microphone 52, which is preferably built into CATV converter 50 and is operative to detect a speech signal. Microphone 52 converts the speech signal to an electric signal as is well known in the art. The electric signal is provided to a speech recognition unit 54, also referred to as a voice recognition unit. Hereinafter, the terms "Speech recognition" and "voice recognition" are interchangeably used.

Speech recognition unit 54 may be either a speaker dependent speech recognition unit or a speaker independent speech recognition unit. A description of such conventional voice recognition units, which are well known in the art, may be found in many publications, such as in a book entitled "Automatic Speech Recognition, The Development of the SPHINX System", by Kai-Fu Lee, Kluwer Academic Publishers, on pp. 1–5, and in a book entitled "Digital Speech Processing, Synthesis, and Recognition", by Sadaoki Fururi, Marcel Dekker, Inc. Publishing, in Chapter 8.

Generally, in a speaker dependent speech recognition configuration a speaker is identified, and only words or phrases which are spoken by the identified speaker are recognized. In a speaker independent speech recognition configuration specific words are recognized, regardless of the person who speaks them.

The separate applications of these two configurations of speech recognition units to the present invention are discussed in detail below, and with reference to FIGS. 4A and 4B and FIGS. 5A–5I.

It is to be appreciated that speech recognition unit 54 may be embedded in a single chip, or alternatively, speech recognition unit 54 may be a separate electronic card which is inserted in a slot (not shown) in CATV converter 50.

In a preferred embodiment of the present invention speech recognition unit 54 is coupled to the following units: a subscriber input/output (I/O) interface 56, a processor 58, a memory 60, an on-screen-display (OSD) unit 62, a decrypter 64, a speaker 66, a CATV receiver and tuner 72, and a compressor/decompressor 74 which may form part of CATV receiver and tuner 72.

Preferably, input parameters and factors for operation of speech recognition unit 54 may be provided to speech recognition unit 54 via I/O interface 56. The input parameters and factors may include a selection of an operation mode of CATV converter 50 as described hereinafter, and various thresholds, such as a background noise threshold.

I/O interface 56 typically receives the input parameters and factors from the remote control via an infrared or an RF link, or by wire from a keyboard 68, which may be a conventional keyboard that typically forms part of conventional CATV converters. Preferably, the input parameters and factors are received in response to requests to input parameters and factors which are presented to the subscriber on television 12 of FIG. 1.

In a preferred embodiment of the present invention speech recognition unit 54 may include conventional interface circuitry for operating speaker 66. Preferably, speaker 66 may be employed to provide voice messages to the user. The voice messages may be accompanied by messages displayed on television 12 of FIG. 1. Preferably, speaker 66 may be a speaker of the television.

It is to be appreciated that speech recognition unit 54, in both configurations of speaker dependent and speaker independent units, and processor 58 may each control the operation of on-screen-display (OSD) unit 62 and may generate messages and graphic information which are converted by OSD 62 to a format suitable for display on a conventional television display as is well known in the art. The messages may include error messages and control messages which are displayed on television 12 of FIG. 1.

Preferably, at least part of the messages and graphic information are stored in memory 60 and retrieved as required from memory 60 by speech recognition unit 54 and by processor 58 respectively.

Additionally, each one of speech recognition unit 54 and processor 58 may also control decryption of information in accordance with an authorization signal or code which may be entered by the subscriber via keyboard 68. Alternatively, the authorization signal may be a voice code which is provided by the subscriber via microphone 52 and is processed by speech recognition unit 54. Further alternatively, information may be decrypted under control of a smart card (not shown).

It is to be appreciated that speech recognition unit 54 and processor 58 may be embedded in a single unit or chip. Since, typically, processor 58 prepares information to be used by speech recognition unit 54, embedding unit 54 and processor 58 in a single chip may save space and may be more efficient.

In accordance with a preferred embodiment of the present invention processor 58 communicates with memory 60, with OSD 62, with decrypter 64 and with a telephone modem 70 which is employed to provide uplink transmissions as described hereinabove. Preferably, processor 58 also communicates with CATV receiver and tuner unit 72 and is operative to provide instructions and data to CATV receiver and tuner 72, and to control the operation of CATV receiver and tuner 72.

In accordance with a preferred embodiment of the present invention CATV receiver and tuner 72 receives programming material and information at a plurality of channels from a pay television network (not shown). CATV receiver and tuner 72 provides the programming material and information to television 12 of FIG. 1.

Preferably, the programming material transmitted via the pay television network and received at CATV receiver and tuner 72 may include regular television programs and data related to a program guide. The data related to the program guide typically includes information about scheduled television programs at various pay television channels. In a preferred embodiment of the present invention the program guide is an electronic program guide (EPG), and the program guide data is typically transmitted in a digital form.

It is to be appreciated that the program guide may occupy a separate pay television channel. Alternatively, at least part of the program guide data may accompany regular programming channels.

Preferably, the subscriber may browse through the program guide, operate features in the program guide, refer to data presented on on-screen menus, retrieve selected program guide data, record programs, make selections and configure the program guide. All these operations may be performed either in a conventional mode of operation by pressing keys in the remote control, or in a voice activated mode of operation by entering voice commands and instructions and by making voice selections. Additionally, these operations may be done while the subscriber watches television.

The voice commands and the voice selections may be processed either at the remote control or at CATV converter 50. When the voice commands and selections are processed at CATV converter 50, the data related to the program guide may be processed by speech recognition unit 54 or by processor 58, and stored in memory 60.

Upon activation of any program guide feature by the subscriber, preferably by entering voice commands and selections as described hereinafter, program guide data is retrieved from memory 60 and processed in processor 58. The processed program guide data is typically displayed on television 12 of FIG. 1 in accordance with the commands and the selections entered by the subscriber.

It is to be appreciated that the programming material received from the CATV network may be in a digital compressed form. In such a case CATV receiver and tuner 72 may employ compressor/decompressor unit 74 to decompress the digital material. The decompressed digital material is preferably converted to an analog form in CATV receiver and tuner 72 and is displayed on television 12 of FIG. 1.

If the portion of the programming material which includes program guide data is in a compressed form, the program guide data may be stored in a compressed form in memory 60. Then, compressor/decompressor 74 retrieves the compressed program guide data from memory 60 and decompresses the program guide data prior to displaying on television 12.

It is to be appreciated that compressor/decompressor 74 may be also employed to compress speech characteristics of users prior to storage in memory 60. Upon retrieval from memory 60, the speech characteristics are decompressed by compressor/decompressor 74. The definition and use of the speech characteristics is described below.

Preferably, processor 58 may also communicate with an image processor 76 which processes images received from camera 26 of FIG. 1.

As mentioned before, CATV converter 50 may operate either in a voice activated mode, or in a conventional mode of operation, i.e. by pressing conventional function keys and digit keys on keyboard 68 or corresponding keys on the remote control. Selection of the voice activation mode is enabled by pressing a voice activation key 78 in keyboard 68, or a corresponding voice activation key in the remote control. Preferably, when key 78 is pressed, the voice activated mode of operation is effective.

Upon enabling speech control of CATV converter 50 by pressing key 78, the conventional function keys and digit keys in keyboard 68 are preferably disabled, and the subscriber may provide voice commands by speaking directly to microphone 52 of CATV converter 50, or to an internal microphone (not shown) in the remote control.

Preferably, the voice commands received at the microphone are provided to speech recognition unit 54 in which they are processed and compared to reference messages that may be stored either in a memory (not shown) which forms part of speech recognition unit 54 or in memory 60. Speech recognition unit 54 may provide the processed commands to processor 58, or it may control various functions of CATV receiver and tuner 72 in accordance with the types of the commands.

Alternatively, if the remote control is employed, and the subscriber speaks to the internal microphone of the remote control, the voice commands are processed in a speech recognition unit (not shown) in the remote control. Then, the remote control transmits to I/O interface 56, over the air, a series of infrared signals which represent the voice commands. The series of infrared signals are transmitted in response to the voice commands, and I/O interface 56 receives the infrared signals and converts them to electric signals which are provided to processor 58.

The processed voice commands received at processor 58, either from I/O interface 56 or from speech recognition unit 54, are preferably processed by processor 58 and employed to control various functions of CATV receiver and tuner 72 and to allow selections of programming material on an on-screen program guide as described below with reference to FIGS. 5A–5I. Alternatively, in the case that the voice commands are processed at speech recognition unit 54, the various functions of CATV receiver and tuner 72 and the selections of the programming material on the on-screen program guide may be controlled either by speech recognition unit 54 or by processor 58.

Typically, the subscriber watches television programs, possibly with other members of his family, and each viewer may wish to make viewing selections by entering voice commands. However, it may not be desirable to allow each viewer to enter voice selections whenever he wishes to, or to allow execution of a command or a selection whenever it is said regardless of the person who speaks it since this may cause confusion and change previous selections when there is no intention to do so. Thus, it is to be appreciated that a separation between speakers is preferred, and only commands and selections of one viewer at a time are executed, regardless of the number of viewers that speak in the vicinity of the viewer.

Additionally, it is to be appreciated that a voice command and a voice selection are preferably required to be separated from background noise which may include audio from a television program, and conversations between people in the vicinity of the subscriber. This requirement is discussed below with reference to FIGS. 5A–5I.

If speech recognition unit 54 is a speaker independent unit, any legitimate command which is spoken is executed, regardless of the viewer who speaks it, or if it is mentioned in a television program.

If speech recognition unit 54 is a speaker dependent unit, unit 54 is required to recognize each speaker. This may be done by prior training of unit 54 by each speaker.

Preferably, such training of unit 54 may include repetitively speaking command and selection words and phrases by a viewer. The spoken words are received at microphone 52 and are analyzed in speech recognition unit 54. The results of such training may form the speech characteristics of each viewer, which are then stored in the internal memory of speech recognition unit 54 or in memory 60. Typically, the speech characteristics of a viewer may include phonemes and subphonemes, and utterance templates, such as word reference templates, as is well known in the art.

It is to be appreciated that a training mode of CATV converter 50 may be obtained by pressing a training key 80 on keyboard 68. Preferably, viewing selections cannot be performed when CATV converter 50 is in the training mode.

The requirement for separate training for each viewer in the case of a speaker dependent configuration of speech recognition unit 54 allows substantially simple separation between various speakers as is well known in the art. Thus, in order to avoid multiple simultaneous spoken commands from various viewers and background noise, CATV converter 50 may be configured to follow instructions of one viewer at a time.

Such configuration of CATV converter 50 may be achieved by a selection of an operative viewer which may be performed by operation of a viewer selection key 82 in keyboard 68, or of a corresponding key in the remote control, or by any other appropriate means. Preferably, successive operation of selection key 82 results in selection of subsequent operative viewers.

Alternatively, in a configuration in which camera 26 and image processor 76 are coupled to CATV converter 50, or form part thereof, an operative viewer may be selected automatically by employing camera 26 and image processor 76 of FIG. 1. In a preferred embodiment of the present invention camera 26 is positioned to take pictures in a relatively narrow field of view which covers, for example, an armchair on which a viewer sits, such as armchair 11 of FIG. 1, and the surroundings of the armchair. Camera 26 may be either an analog camera or a digital camera, and the pictures taken thereof may be analog pictures or digital pictures respectively.

Preferably, camera 26 is manually positioned by the viewer or by a member of the viewer's family to take pictures of the viewer. Alternatively, the viewer may employ a gimbal mounted camera (not shown) with motors that move the gimbal and a control box which controls the motors (not shown) as is well known in the art. Preferably, the viewer may control the position of the camera, via keys (not shown) in the control box, which actuate the motors to rotate the gimbal to a required direction so that the face of the viewer appears in the frame of camera 26.

Typically, only one viewer sits on the armchair, and only his face appears in the frame of camera 26. The faces of other viewers, which may pass by the armchair, generally do not appear in the frame of camera 26.

In a preferred embodiment of the present invention the picture of the viewer's face is captured and provided to image processor 76 which may be a conventional image processor that captures images and allows comparison of the captured images to previously captured images or to stored images. If camera 26 is a video camera, the viewer's face is constantly captured and processed in image processor 76. If camera 26 is a still camera, a "frozen" picture of the viewer may be taken periodically, such as every 5 seconds.

Preferably, if camera 26 is a video camera, image processor 76 employs conventional processing techniques which are well known in the art to determine whether the same face of the viewer appears in the frame of camera 26 for a pre-selected time period, which may be of the order of about 30 seconds.

It is to be appreciated that even if the viewer moves his face between subsequent pictures the conventional processing techniques allow identification of the viewer. If however, a substantial portion of the viewer's face is absent from the frame of camera 26, such as when the viewer turns to one side or gets up from his armchair, image processor 76 may refer to previous images of the viewer which are taken at the beginning of the current photographing session. Thus, image processor 76 determines a current viewer even if the viewer's face appears in the frame of camera 26 for a portion of the pre-selected time period.

Then, image processor 76 compares the image of the viewer whose face appears in the field of view of camera 26 for the pre-selected time period, or for a portion thereof, to a series of previously taken digital images of viewers which are stored in a library of digital images in memory 60. The current operative viewer is determined as the viewer whose stored image matches, or is substantially similar to, a current captured image of a viewer whose face continuously appears in the frame of camera 26.

Preferably, the library of digital images of the viewers and a library of speech characteristics of the viewers are created when CATV converter 50 is installed, or at any other suitable time. In a preferred embodiment of the present invention each viewer is photographed by camera 26, and each viewer trains speech recognition unit 54 and records his speech characteristics, in the case of a speaker dependent configuration of speech recognition unit 54. The digital images of the viewers and the corresponding speech characteristics of the viewers may be stored in an internal memory in image processor 76 (not shown) and in an internal memory (not shown) in speech recognition unit 54 respectively, or in memory 60.

It is to be appreciated that for each viewer, an image of a viewer may be correlated to speech characteristics of the viewer. In a preferred embodiment of the present invention an identity code is associated with the image of the viewer in the library of digital images. The same identity code is also associated with the speech characteristics of the viewer. Thus, the images and the speech characteristics of the viewers may be accessed by employing the identity codes.

Thus, image processor 76 may output, as a result of the comparison of images performed thereby, a current operative viewer identity code which is associated with the current operative viewer determined thereby. The current operative viewer identity code may be provided, via processor 58, to speech recognition unit 54.

In accordance with a preferred embodiment of the present invention speech recognition unit 54 correlates voice commands and voice selections received threat to the pre-recorded speech characteristics of the current operative viewer determined by the identity code received from processor 58. If a match is found, speech recognition unit 54 determines that a current speaker is the current operative viewer, and executes commands and selects operating characteristics of the communication system in response to the voice commands and the voice selections provided by the current operative viewer.

The operating characteristics of the communication system may preferably include features such as program selection, system configurations, parental control, messages, program guide scheduling, and available channels. Selections of the operating characteristics may include, for example, a selection of a program to be viewed, a selection of a specific system configuration, a selection for implementation of parental control for specific programs, and a selection of recording of a scheduled program.

It is to be appreciated that the speech characteristics which are stored in memory 60 may be retrieved therefrom by speech recognition unit 54 or by processor 58. The images which are stored in memory 60 may be retrieved therefrom by image processor 76 or by processor 58.

Preferably, in a case that the current operative viewer changes places with a second viewer, and the face of the second viewer is photographed by camera 26, the second viewer becomes a new current operative viewer. In that case, speech recognition unit 54 executes voice commands provided by the new current operative viewer in accordance with speech characteristics which are associated with the new current operative viewer.

It is to be appreciated that in the speaker independent configuration of speech recognition unit 54, separation between multiple speakers is more difficult, and may be performed by employing special methods as described hereinafter with reference to FIGS. 5A–5I. As mentioned above, such separation may be crucial in order to avoid errors in operation of CATV converter 50 due to casual spoken words which may be said in typical conversations that are normally conducted when many viewers watch a television program.

It is to be appreciated that CATV converter 50 may be operative without image processor 76 and video camera 26. In such a case, determination of a current operative viewer may be obtained by use of viewer selection key 82 as described above, and by employing the method described below with reference to FIGS. 5A–5I.

In a preferred embodiment of the present invention telephone modem 70, which communicates with processor 58, is a conventional telephone modem. Generally, in state-of-the-art pay television systems, modems, such as modem 70, are coupled to a telephone network, such as telephone network 21 of FIG. 1, and are typically employed to receive messages, and instructions from headend 13 of FIG. 1 for billing purposes.

Figure 3:
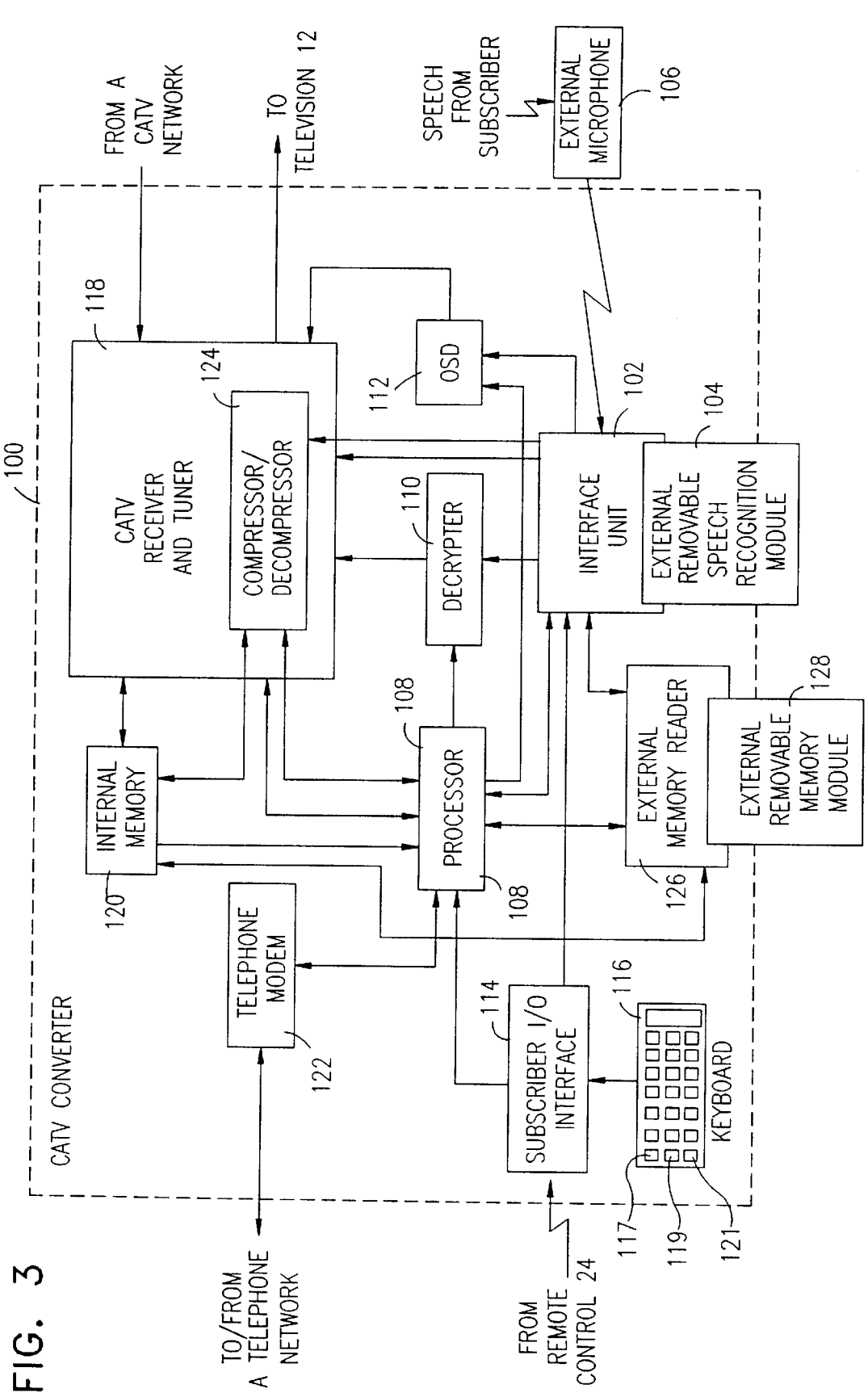
FIG. 3 is a generalized block diagram illustration of an alternative preferred implementation of a CATV converter which forms part of the system of FIG. 1.

Reference is now made to FIG. 3 which is a generalized block diagram illustration of an alternative preferred implementation of a CATV converter 17 of FIG. 1. The apparatus of FIG. 3, is indicated by reference numeral 100, and is substantially similar in functionality and structure to the apparatus of FIG. 2 except that some of the units in CATV converter 100 are external removable modules as described below.

In a preferred embodiment of the present invention CATV converter 100 includes an interface unit 102 which is operative to accept an external removable speech recognition module 104. It is to be appreciated that external removable speech recognition module 104 may have the same functionality and may operate substantially similarly to speech recognition unit 54 of FIG. 2. Preferably, external removable speech recognition module 104 is in the form of an electronic card, and interface unit 102 includes an electronic card interface unit.

Interface unit 102 is operatively coupled to an external microphone 106 via which a subscriber may provide voice commands that may be processed in module 104. Preferably, microphone 106 is a conventional wireless microphone.

Interface unit 102 may be also coupled to a processor 108, a decrypter 110, an OSD 112, a subscriber I/O interface 114, and a CATV receiver and tuner 118 which are similar in structure and functionality to processor 58, decrypter 64, OSD 62, subscriber I/O interface 56, and CATV receiver and tuner 72 of FIG. 2 respectively. Interface unit 102 may be also coupled to a compressor/decompressor 124 which may form part of CATV receiver and tuner 118.

I/O interface 114 is coupled to a keyboard 116 which is substantially similar in structure and functionality to keyboard 68 of FIG. 2 and has the same functional keys as mentioned above with reference to keyboard 68, including a voice activation key 117, a training key 119, and a viewer selection key 121 which are substantially similar to keys 78, 80 and 82 of FIG. 1, respectively.

Processor 108 is preferably coupled to CATV receiver and tuner 118, to an internal memory 120 and to a telephone modem 122 which are respectively similar in structure and functionality to CATV receiver and tuner 72, memory 60 and modem 70 of FIG. 2. CATV receiver and tuner 118 is operative to receive programming material and information at a plurality of channels from a communication network (not shown) which may preferably be a CATV network. CATV receiver and tuner 118 provides the programming material and the information to television 12 of FIG. 1.

Preferably, the programming material includes regular television programs and the information includes program guide data. Upon activation of any program guide feature by the subscriber, preferably by entering voice commands and selections as described with reference to FIG. 2, at least a portion of the program guide data is retrieved from memory 120 and processed in processor 108. The processed program guide data is displayed on television 12 of FIG. 1 in accordance with the commands and the selections entered by the subscriber.

In accordance with a preferred embodiment of the present invention CATV receiver and tuner 118 includes a compressor/decompressor unit 124 which is employed to decompress compressed digital signals as mentioned above with reference to FIG. 2. Compressor/decompressor unit 124 is preferably coupled to processor 108 and to internal memory 120 and is operative to compress/decompress information processed at processor 108, information processed at external removable speech recognition module 104 and information communicated to/from memory 120.

Interface unit 102 may also be coupled to an external memory reader 126 which is operative to accept an external removable memory module 128. Preferably, module 128 is one of an optical memory card, a magneto-optical memory card, a magnetic memory card, a memory diskette and a CD-ROM module.

It is to be appreciated that a portion of the material to be stored in internal memory 120 may be stored in external removable memory module 128. Preferably, such material may include the speech characteristics of each viewer as mentioned above with reference to FIG. 2, data, preprogrammed voice selections, and execution programs which are associated with speech recognition features.

Preferably, data which is related to conventional, non-voice activated operation of CATV converter 100, and program guide data which is transmitted via the CATV network, as mentioned before with reference to FIG. 2, is preferably stored in internal memory 120. Thus, the absence of module 128 does not affect a conventional mode of operation of CATV converter 100.

One of the advantages of CATV converter 100 of FIG. 3 is that a non-voice activated CATV converter can be easily upgraded to include voice activation features and modules, and thus to provide a voice activation mode of operation of the CATV converter.

It is to be appreciated that the above mentioned upgrading option enables manufacturers of CATV converters to produce relatively low-cost CATV converters, which are not voice activated, and when subscribers require the voice activation features, they may upgrade the low-cost CATV converters.

In such a case, a subscriber may purchase a few removable external units, i.e. external removable speech recognition module 104, external removable memory module 128 and microphone 106, and then insert speech recognition module 104 and external memory 128 in interface unit 102 and in external memory reader 126 respectively, and connect microphone 106 to a suitable connector (not shown) in his CATV converter.

Additionally, the use of removable modules enables the subscriber to employ modules which include his own individual speech characteristics with any voice activated CATV converter that includes removable modules. Thus, for example, the subscriber may remove modules 104 and 128 from a CATV converter at his residence and place them in a CATV converter at a hotel.

It is to be appreciated that a video camera, such as video camera 26 of FIG. 1, and an image processor, such as image processor 76 of FIG. 2, may be added to CATV converter 100. In such a case, the video camera and the image processor may have the same structure and functionality as video camera 26 of FIG. 1 and image processor 76 of FIG. 2 respectively, and external removable memory module 128 may include the digital images of the viewers as mentioned above with reference to FIG. 2.

In an alternative embodiment of the present invention the video camera and the image processor may be absent, as mentioned above with reference to FIG. 2.

Figure 4A:
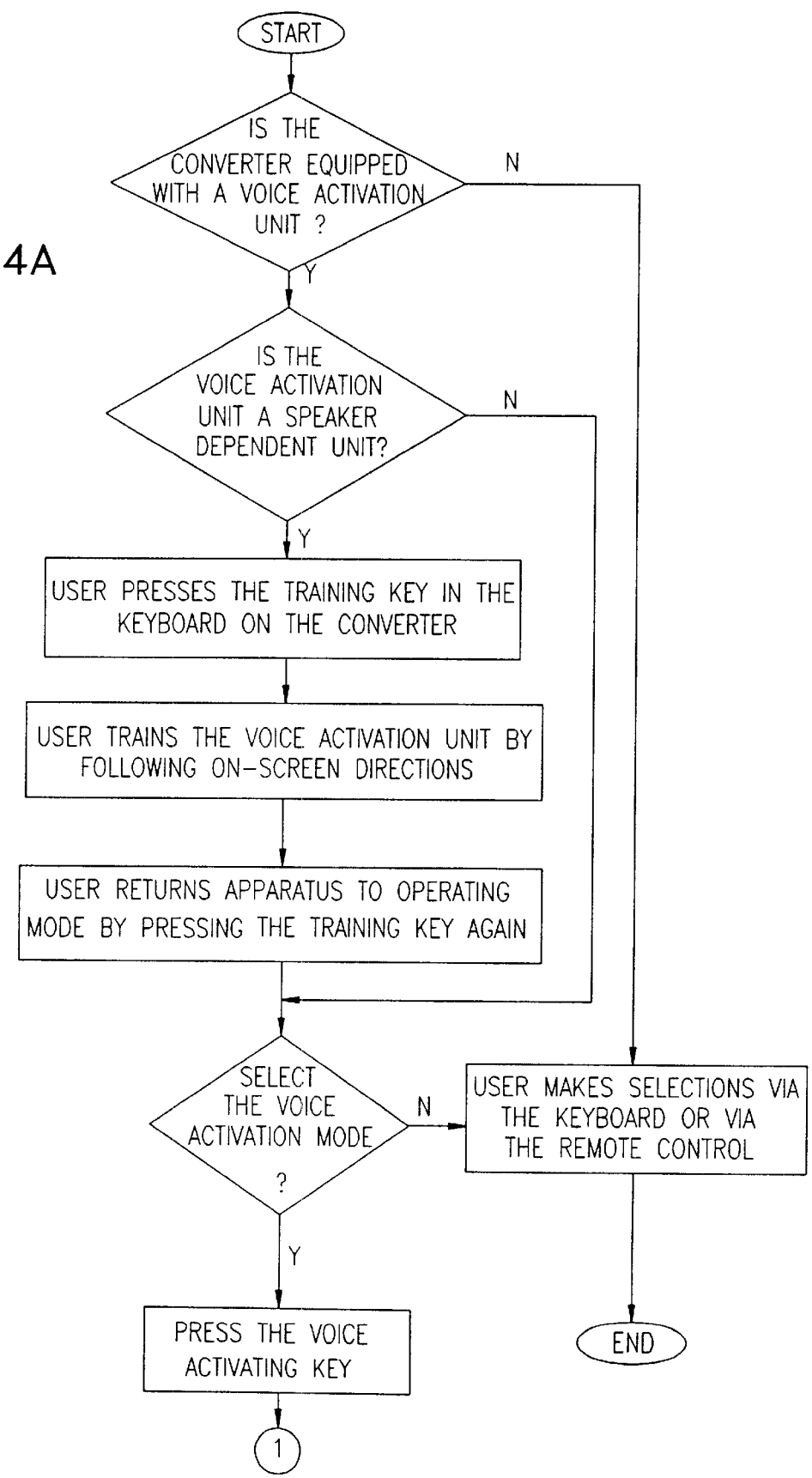
FIGS. 4A and 4B together constitute a flow chart illustrating a preferred method of operation of either one of the CATV converter of FIG. 2 and the CATV converter of FIG. 3.
Figure 4B:
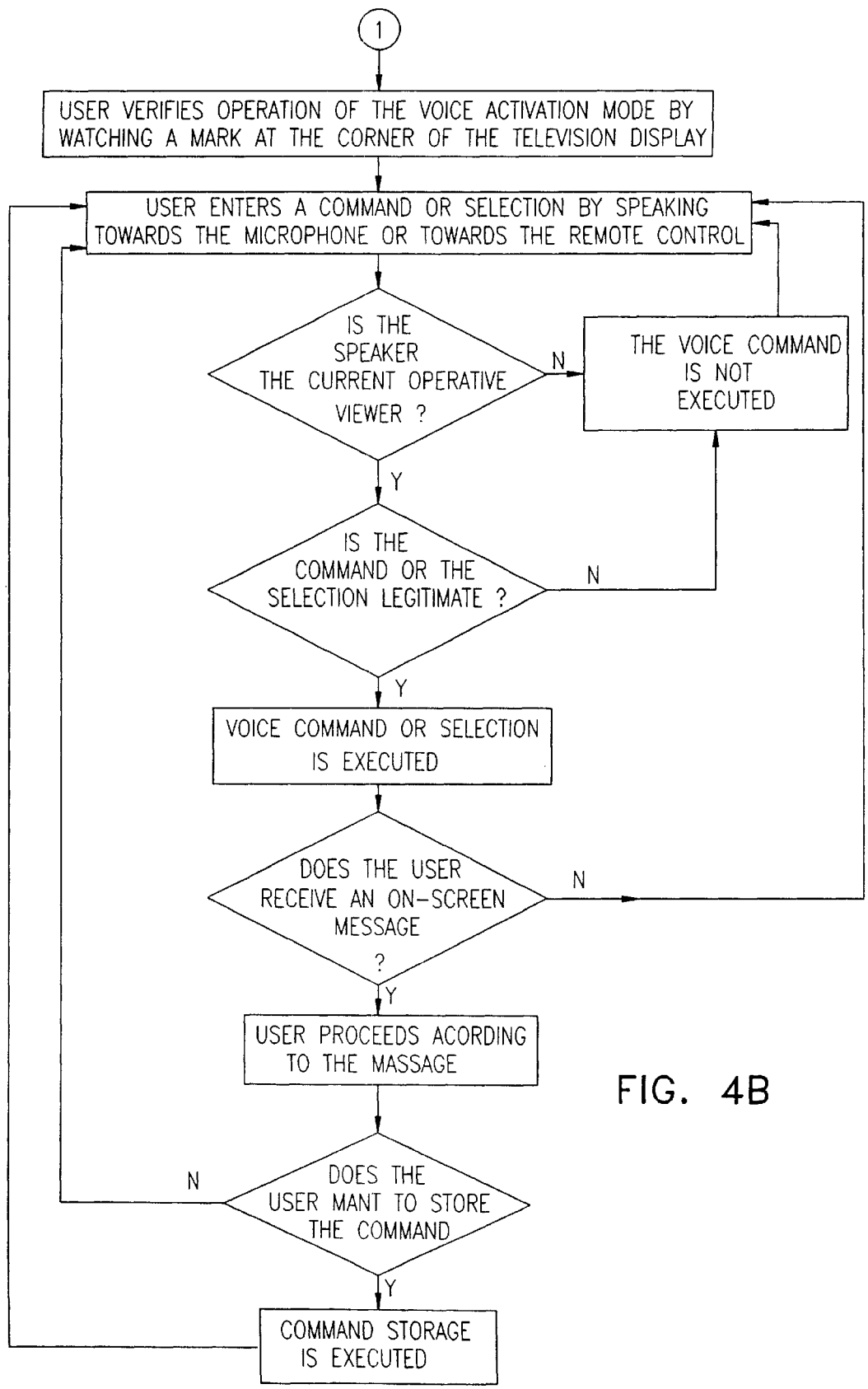

Reference is now made to FIGS. 4A and 4B which together constitute a flow chart illustrating the operation of the apparatus of FIG. 2 or the apparatus of FIG. 3 in accordance with a preferred embodiment of the present invention.

If a subscriber owns a CATV converter which includes a voice recognition unit, such as described with reference to FIG. 2 or FIG. 3, the CATV converter may be configured either by a remote control or by speaking, from a distance, at an internal microphone of the CATV converter.

If the voice recognition unit is a speaker dependent speech recognition unit, the subscriber may press a training key on a keyboard of the CATV converter to enter a training mode. In the training mode, the subscriber may follow instructions which are displayed on a television.

Preferably, the subscriber is instructed to repeatedly speak several symbols, words and sentences. Each symbol, word and sentence is recorded and analyzed by the speech recognition unit, and is played to the subscriber for verification. Typically, the symbols, words and sentences which are used for training are similar to symbols, words and sentences which are used for making actual selections and for providing actual instructions.

If the subscriber verifies the symbol, word or sentence, the speech recognition unit converts the symbol, word or sentence to phonemes and subphonemes, and utterance templates which form the speech or voice characteristics of the subscriber, and stores the speech characteristics of the subscriber in a memory (not shown).

When the subscriber completes the training of the voice recognition unit, he may press the training key again to return to an operating mode of the CATV converter.

Typically, the training is performed only once. However, if the voice characteristics of the subscriber change with time, such as due to a surgery or due to adolescence, training has to be repeated.

If the voice recognition unit is a speaker independent voice recognition unit, no training is required, and the subscriber may enter selections either by speaking directly to the microphone in the CATV converter, or to a microphone (not shown) in remote control 24 of FIG. 1.

When a voice activation mode is not selected, the subscriber may enter commands and selections in a conventional way, i.e. via the remote control or via a keyboard, such as keyboard 68 of FIG. 2, which forms part of the CATV converter. To select the voice activation mode, the subscriber presses a voice activation key on the keyboard or a voice activation key on a keypad in the remote control (not shown).

If the voice activation mode is selected, a mark indicating that such mode is currently selected is displayed on the television screen. Preferably, the mark is symbolically indicative of the voice activation mode, such as, for example the mark includes a drawing of a microphone, or a drawing of a man speaking, and the symbols "VA" which stand for voice activation. The mark may preferably be located at a corner of the television screen.

Upon selection of the voice activation mode, the subscriber enters voice selections and voice commands which enable manipulation of a program guide system as mentioned above with reference to FIGS. 1–3, and selection of operating characteristics of a communication system.

In a preferred embodiment of the present invention the voice selections include selection codes which are associated with selectable operating characteristics of the communication system which form part of a program guide, and the voice commands include instruction codes which are associated with selectable commands.

Preferably, each selection code determines one of the operating characteristics to be selected. It is appreciated that a selection code may also enable a browsing option for browsing through available operating characteristics. When an instruction code is associated with a selection code, a selection of the operating characteristics which is associated with the selection code is executed.

As mentioned before, the operating characteristics of the communication system may include features such as program selection, system configurations, parental control, messages, program guide scheduling, and available channels. In order to select a specific feature, the subscriber may preferably browse through selection screens by using each time a suitable selection code for a suitable browsing option, and an instruction code which is associated with the selection code for the suitable browsing option. When the specific feature is reached, the subscriber may use a selection code and an instruction code associated thereto to implement selection of the feature.

It is to be appreciated that at least part of the selection codes and the instruction codes may be transmitted from headend 13 of FIG. 1 with program guide information. Alternatively, at least part of the selection codes and the instruction codes may be stored in a memory in the CATV converter, such as memory 60 of FIG. 2, and retrieved therefrom for association with corresponding program guide information.

It is to be appreciated that typically, execution of a selection is performed by saying a voice expression which includes a selection code followed by an instruction code for executing the selection. The use of selection codes and instruction codes in association with operating characteristics of the communication system is described hereinafter with reference to FIGS. 5A–5I.

Preferably, the voice selections and the voice commands are executed sequentially by the voice recognition unit. It is to be appreciated that the voice selections and the voice commands are preferably executed only if the subscriber is identified as the current operative viewer as described hereinabove with reference to FIG. 2.

Additionally, the voice recognition unit also verifies that a voice selection and a voice command spoken by the subscriber, i.e. the current operating viewer, are legitimate. The term "legitimate" is used throughout the specification and claims, in conjunction with selections and commands, to indicate executable selections and commands, i.e. selections and commands which are pre-designed to be executed.

Preferably, verification of the voice selections and the voice commands may be performed by comparison of symbols, words and sentences, which may form part of the above mentioned selection codes and instruction codes that are spoken by the subscriber, to reference symbols, words and sentences which may be stored in the memory. Preferably, only legitimate commands and selections are executed.

In some cases, on-screen messages may be generated as a result of the execution of voice selection and commands. Such messages may include conditional access warning messages, billing messages, announcements and control information. In a preferred embodiment of the present invention, in order to continue inputting selections and commands, the subscriber must proceed according to the displayed messages.

In a preferred embodiment of the present invention a voice selection or command, or a series of voice selections and commands may be stored to create a favorite selection subroutine. In such a case, the voice selection or command may be stored in a memory, such as memory 60 of FIG. 2, or external removable memory module 128 of FIG. 3. After the selection or command is stored, the subscriber may enter additional voice selections and commands which may be also stored in accordance with the preferences of the subscriber.

Reference is now made to FIGS. 5A–5I which are generalized illustrations of selection screens in a voice activated program guide which may be used with the communication system of FIG. 1 and with a television with either of the CATV converter of FIG. 2 or the CATV converter of FIG. 3.

As mentioned above, program guide data is transmitted from a headend, such as headend 13 of FIG. 1, via a communication network to a multiplicity of subscriber units. Preferably, a subscriber unit includes a CATV converter as described above with reference to FIGS. 1–3. The CATV converter is coupled to a television, and the program guide data is displayed on the television.

The program guide data preferably includes schedule information, information related to available communication network configurations, and information related to various services which are available via the communication network.

As mentioned above with reference to FIG. 2, at least part of the program guide data may be processed and stored at the CATV converter. Preferably, the program guide data is displayed on the television in the form of selectable on-screen menus.

Further as mentioned above with reference to FIG. 2, a viewer may operate the program guide, refer to data presented on the on-screen menus, retrieve selected program guide data, make selections and configure the program guide and/or the subscriber unit by entering voice commands and voice selections. These operations may be done while the subscriber watches television by employing a remote control or a keyboard on the CATV converter.

However, it is to be appreciated that a voice activation system built in accordance with methods known in the prior art would typically be associated with the following problems:

(1) the viewer that commands the voice activated program guide and CATV converter has to be distinguished from other viewers that are holding conversations in a noisy environment surrounding the user, and from background audio, and (2) legitimate commands have to be distinguished from casual words spoken by the viewer during a conversation.

The first problem is discussed above in relation to the different configurations of the voice recognition units of FIGS. 2 and 3. It is to be appreciated that the speaker dependent configuration of the voice recognition units of FIGS. 2 and 3 address the problem of distinguishing the voice of a current operative viewer and the voices of other viewers, or background noise, as discussed above.

However, in the speaker independent configuration of the voice recognition units of FIGS. 2 and 3, training of the voice recognition units to recognize words cannot provide a simple distinction between a current operative viewer and other viewers. Rather, in the speaker independent configuration of the voice recognition units of FIGS. 2 and 3, distinction between a current operative viewer and other viewers may be provided by other means, as described below.

To understand and appreciate more fully the second problem of distinguishing legitimate commands from casual words spoken during a conversation, some common command words and selection words, such as: "GO", "YES", "NO", "STOP" and "BACK" are now considered. This words, which may be used in various applications that require a command language, are considered by way of example.

One can easily note that such command language may be inadequate for the purposes of the present invention in the case of a noisy background since command and selection words as mentioned above may be frequently spoken by the viewer in a typical conversation. Thus, if, for example, the viewer responds with a "YES" or a "NO" to a question directed at him during a conversation while the CATV converter is in the voice activation mode, an erroneous selection may be generated upon viewer's response.

Furthermore, in the speaker independent configuration of the voice recognition units of FIGS. 2 and 3, if a viewer other than the current operative viewer speaks one or more of the above mentioned command words and selection words during a conversation while the CATV converter is in the voice activation mode, an erroneous selection may be generated since the voice recognition unit recognizes these words regardless of the person who speaks them.

It is to be appreciated that this problem does not typically occur in conventional voice recognition applications since generally, voice recognition applications are employed in environments in which only one person speaks without interference from other speakers. Such a conventional application may be found in a telephone purchase system in which a buyer places a call to a central office and orders an item by entering voice selections and instructions in response to selection possibilities conveyed to him over the telephone.

In a preferred embodiment of the present invention common command words and selection words as mentioned above may be implemented as an optional command language which is to be used when a viewer watches television by himself, in a quiet environment. The optional command language may be operative by activating a special purpose command language key (not shown) in the remote control or in the CATV converter.

If the environment of the viewer is a noisy environment, which it typically the case in many locations in which CATV systems are installed, such a common command language cannot be adequately employed with any configuration of the speech recognition units.

In a preferred embodiment of the present invention a method is provided which is operative to solve the above mentioned problems in speaker dependent voice recognition systems and in speaker independent voice recognition systems which operate in noisy environments. The method avoids erroneous selections, and selections made by viewers other than a current operative viewer, by employing special word combinations and phoneme combinations for voice commands and voice selections as described below with reference to the structure of each selection screen illustrated in FIGS. 5A–5I.

Preferably, the special word combinations are instantaneously created special purpose combinations which may be created for each individual command or selection. The special word combinations are generated in accordance with simple logical rules which may be clearly displayed on the television. It is to be appreciated that, typically, these combinations are not employed in a conversation.

In a preferred embodiment of the present invention the logical rules are identical for all the on-screen menus which form part of the program guide and are structured to enable voice activation.

Typically, the on-screen menus have structures which include arrangements in one-dimensional table formats, arrangements in two-dimensional table formats, and arrangements in screens having pre-positioned ordered or non-ordered selection areas or area cells, such that when the current operative viewer, taken by way of example to be a subscriber, selects one of the selection areas on a screen, information associated with the selected area may be displayed. Preferably, selections are made by placing an indicator on a requested area or area cell or moving a cursor on the screen to a requested area or cell and by providing a voice instruction when the indicator or cursor is positioned on the requested area or cell.

It is to be appreciated that the indicator or the cursor may be an arrow pointing at the selected area. Alternatively, the indicator may be an indicator as employed in computer software, such as a change of color of the selected cell with respect to the other cells, or a change of color of the background of the selected cell with respect to the background of the other areas or cells.

In a preferred embodiment of the present invention the one-dimensional tables may include horizontal or vertical banners, such as program banners, which may be overlaid on regular television programs or on images taken thereof.

Preferably, the one-dimensional tables may each include either a row or a column of selection areas which may be overlaid on regular television programs or on frozen images taken thereof. It is to be appreciated that a one-dimensional table may be implemented as a table having one row and many columns, or as a table having one column and many rows.

The two-dimensional tables are preferably displayed on a portion of the television display, whereas programming material is displayed on other portions of the television display.

In a preferred embodiment of the present invention when a voice activation mode is selected, a main on-screen menu, such as illustrated in FIG. 5A, is displayed on the television. The main on-screen menu is indicated by reference numeral 200, and is a typical representation of an arrangement of a screen in a two-dimensional table format.

Preferably, menu 200 is chained and linked to additional on-screen menus in accordance with a pre-programmed algorithm which may be resident in a memory, such as memory 60 of FIG. 2, or may be provided over the air or via cables from headend 13 of FIG. 1.

The additional on-screen menus enable conventional CATV selections of channels, programs, recording data, time schedules, various services, general information relating to programs and channels, and configuration of the program guide as described below.

In a preferred embodiment of the present invention on-screen menu 200 includes a plurality of sub-displays on which different types of data may be displayed. A conventional television program may be displayed on a video sub-display 202. Premium schedule data may be displayed on a premium schedule sub-display 204 which is located next to video sub-display 202. Premium schedule sub-display 204 may include a list of current featuring premium programs.

Preferably, a sub-display 206 may be located underneath sub-displays 202 and 204. Sub-display 206 may include an indication of the voice mode operation of the program guide. Such indication may include a sub-display 208 which may flicker to draw the attention of the subscriber.

Additionally, sub-display 206 may also include a sub-display 210 which is located next to sub-display 208. Preferably, current date information and a clock which continuously displays a current time are displayed on sub-display 210.

In a preferred embodiment of the present invention on-screen menu 200 also includes a two-dimensional on-screen menu selection table 212. Preferably, a cell in table 212 is defined by a row and a column, and the cell may be addressed by providing a voice command in which the subscriber speaks an identification character that indicates the row and an identification character that indicates the column. In FIG. 5A the rows are indicated by letter characters "A" and "B", and the columns are indicated by number characters "1", "2", "3" and "4". Thus, by saying combinations such as "A1" and "B4", the appropriate cells may be addressed and selected.

It is to be appreciated that each such combination forms a selection code which is associated with a particular cell in the two-dimensional selection table 212 and thus with a particular operating characteristics of the communication system which is represented by the cell. The selection codes may be either transmitted with the program guide information which is displayed in the cells, or stored in a memory, such as memory 60 of FIG. 2, and retrieved therefrom for association with the information displayed in the cells.

This method of addressing the cells establishes a simple logical selection rule that is generally similar to selection rules employed in crossword puzzles or in a chess game which are recognized by people worldwide.

It is to be appreciated that by saying an appropriate combination of a character and a number the subscriber may select any cell in table 212. One can easily note that such combinations are not generally used in a conversation and are therefore adequate for use with voice selections in a voice activated program guide.

In accordance with the above mentioned selection rule, the subscriber may address the on-screen menus mentioned in table 212 by saying the following combinations:

| Say | Address Cell |
|-----|--------------|
| A1 | PROGRAM SCHEDULE |
| A2 | CHANNEL LIST |
| A3 | FAVORITES |
| A4 | PRIME TIME |
| B1 | RECORDING SCHEDULE |
| B2 | SYSTEM CONFIGURATION |
| B3 | PARENTAL CONTROL |
| B4 | E-MAIL MESSAGES |

A detailed description of each of the above mentioned menus in table 212 is provided below with reference to FIGS. 5B–5I.

It is to be appreciated that the above mentioned selection rule may be applied to any two-dimensional selection table in which individual selection of each cell is required. Furthermore, each table may include identification letter and number characters which may be similar to characters used in another table since any selection is instantaneous and is made with reference to a current displayed table.

Additionally, the subscriber is not required to memorize programming commands and various selection rules but rather use letter and number characters which are displayed on the television and one selection rule for combining the characters to generate a selection code for selecting a particular one of the operating characteristics presented in a table.

When the subscriber selects a requested one of the operating characteristics of the communication system by saying a voice expression which includes the selection code that is associated with the requested one of the operating characteristics, the selection code is verified to be legitimate, i.e. associated with a legitimate selection of one of the available operating characteristics displayed in the current table. Preferably, a selection is made only if the selection code is legitimate.

In a preferred embodiment of the present invention saying the voice expression includes sequentially saying the components of the selection code, i.e. saying the character which is associated with the row and the character which is associated with the column in any order thereof.

Figure 5B:
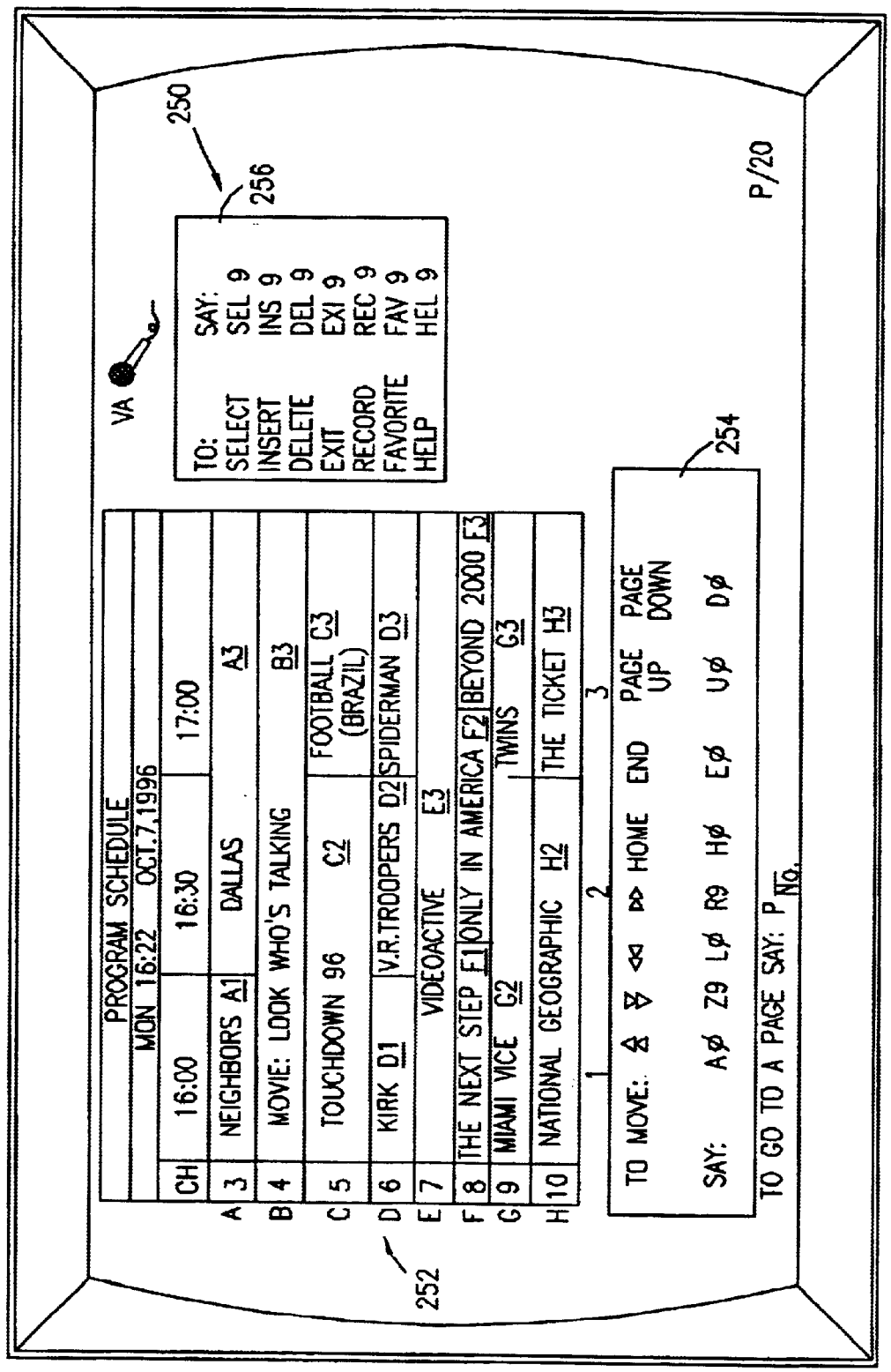

Referring now to FIG. 5B, an example of the program schedule menu which may be selected from the main menu of FIG. 5A by saying the selection code "A1" followed by "SEL9" is considered. The program schedule menu, which is indicated by reference numeral 250, is another typical representation of an arrangement of a screen in a two-dimensional table format.

Preferably, program schedule menu 250 includes a table 252 which is structured as a two-dimensional grid that includes an ordered or non-ordered crossed mesh, the ordered mesh having identical cell sizes and the non-ordered mesh having various cell sizes.

In a preferred embodiment of the present invention table 252 includes information on channels, programs to be displayed on each channel, and featuring time and date of each program. Alternatively, other information may be provided in the same grid, such as languages spoken on each program, and main actors featured on each program.

In another preferred embodiment of the present invention table 252 may include more cells than illustrated in FIG. 5B, and accordingly, additional information may be provided.

Preferably, a table of instructions 254 is located below table 252 and a table of instructions 256 is located adjacent to table 252. In a preferred embodiment of the present invention table 254 includes instructions for navigating in table 252 by employing the following voice combinations:

| TO MOVE: | SAY: |
| --- | --- |
| UP | A0 |
| DOWN | Z9 |
| LEFT | L0 |
| RIGHT | R9 |
| HOME | H0 |
| END | E0 |
| PAGE UP | U0 |
| PAGE DOWN | D0 |

Table 256 includes instructions for executing operations by employing the following voice combinations:

| TO: | SAY: |
| --- | --- |
| SELECT | SEL9 |
| INSERT | INS9 |
| DELETE | DEL9 |
| EXIT | EXI9 |
| RECORD | REC9 |
| FAVORITE | FAV9 |
| HELP | HEL9 |

Preferably, any selection of a cell in table 252 may be executed only if followed by the SELECT instruction in which the subscriber is required to say the code having the combination "SEL9". Additionally, any voice instruction in table 256 is operative only with a selected cell. Thus, the term "selection" is also used below in conjunction with an instruction to execute the selection which may follow the selection, and such instruction may include any instruction code from table 256.

It is to be appreciated that a navigation instruction from table 254 is not to be followed by an execution instruction from table 256. Thus, for example, when the subscriber says "U0" a PAGE UP jump is executed immediately.

In a preferred embodiment of the present invention the instructions INS9 and DEL9 may be employed by the subscriber to reorder the grid. This is preferably done by selecting a channel, such as C0, deleting the line in the grid by using DEL9, and inserting the line in another place by using INS9.

It is to be appreciated that part of the instructions in table 256, such as INS9 or DEL9, may be irrelevant in some cases. In such a case, these instructions are not executed when the corresponding voice combinations are used.

Preferably, the instruction REC9, when associated with a selected program, may be employed for automatic recording of the program. The instruction FAV9 is employed to pass to a favorite program or channel.

In a preferred embodiment of the present invention the instruction HEL9 may be employed to get a help screen which provides explanations on the usage of the program guide and the current menu.

Menu 250 may also lead the subscriber to other pages by saying the character "P" followed by the required page number. Preferably, the page numbers of the menus described in FIG. 5A are in units of 10, such as 10, 20, 30 etc. Derived menus (not shown), which are derived from the menus described in FIG. 5A, have intermediate page numbers which relate to the appropriate menus, such as 21, 22 etc. which relate to the menu of FIG. 5B.

The above mentioned voice combinations for navigation and for execution are simple combinations which are not normally used in a conversation. Thus, a normal conversation would generally not interfere with such voice commands which include such combinations.

In a preferred embodiment of the present invention a program may be selected by addressing an appropriate cell in the same manner as mentioned before with reference to FIG. 5A, i.e. by saying a code which is a sequential combination of a letter character and a number character, such as A1, E3, and C2. It is to be appreciated that there is no interference between any combination which allows a cell selection and any combination which represents a navigation instruction or an execution instruction.

In order to simplify the selection of a cell, the individual selection combination which is used to address a cell may be displayed in the cell, adjacent to the program name. In such a case, the subscriber may directly see the combination which he has to say in order to select the cell. Preferably, individual selection combinations, as well as the letter and number characters which identify the rows and columns of table 252, are transmitted together with the program guide data.

In a preferred embodiment of the present invention the order of the characters in the cell selection combination may be reversed so that the number character may precede the letter character, thus generating combinations such as 1A, 3E, and 2C. Alternatively, only letter characters or only number characters may be employed to indicate the rows and columns in table 252, and any sequential order of the letter characters and the number characters may be used.

Typically, a basic cell length corresponds to a 30 minute length featuring program. If a program is longer, its schedule is displayed in several cells, with direct relation to program length. In such a case, if, for example, a program schedule is displayed in three cells, the program selection combination may be each one of the combinations which may be used to address each of the three cells. In a preferred embodiment of the present invention, only the combination which is employed to address the last of the three cells is displayed adjacent to the program name, and may be used to select the program.

Preferably, when the subscriber says the combination which relates to the cell, an indicator is placed on the program to be selected. If the subscriber further says the combination SEL9, the CATV converter automatically tunes to the channel in which the program is displayed, menu 250 disappears from the television screen, and the selected program is displayed on the television screen.

Figure 5C:
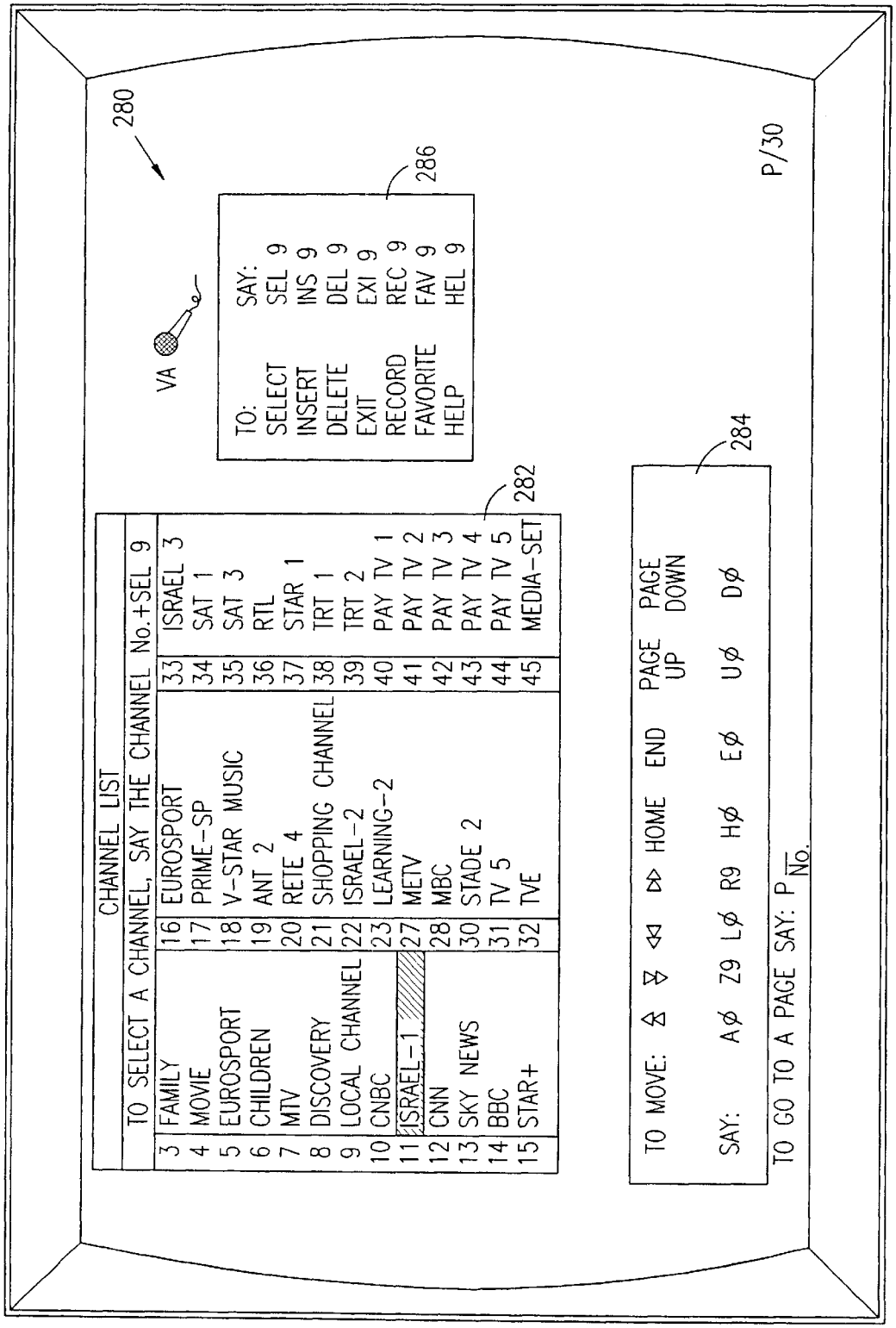

Referring now to FIG. 5C, a channel list menu 280 which may be selected from the main menu of FIG. 5A by saying "A2" followed by "SEL9" is illustrated. Channel list menu 280 is a typical representation of an arrangement of a screen in a one-dimensional table format.

Preferably, channel list menu 280 includes a table 282 having a list of characters which are associated with channel identification names. The characters are preferably number characters which are associated with conventional channel numbers.

It is to be appreciated that table 282 is a one-dimensional table. In the voice activated program guide of the present invention a channel in table 282 may be selected by saying the channel number followed by the voice instruction SEL9 for executing the selection.

If, for example, a requested channel is channel 11, and the number "11" is said, an indicator is placed on channel 11. If, after saying the number "11" the voice instruction SEL9 is said, the selection of channel 11 is executed, the display of channel list menu 280 disappears, and the CATV converter automatically tunes to channel 11 and displays a current program which is featured on channel 11.

In a preferred embodiment of the present invention menu 280 also includes a table of instructions 284 and a table of instructions 286, which are respectively similar to tables of instructions 254 and 256 of FIG. 5B. Tables 284 and 286 are located below table 282 and adjacent to table 282 respectively. Preferably, table 284 and table 286 include instructions for navigating in table 282 and instructions for executing operations in table 282 as mentioned herein above with reference to tables 254 and 256 of FIG. 5B.

Figure 5D:
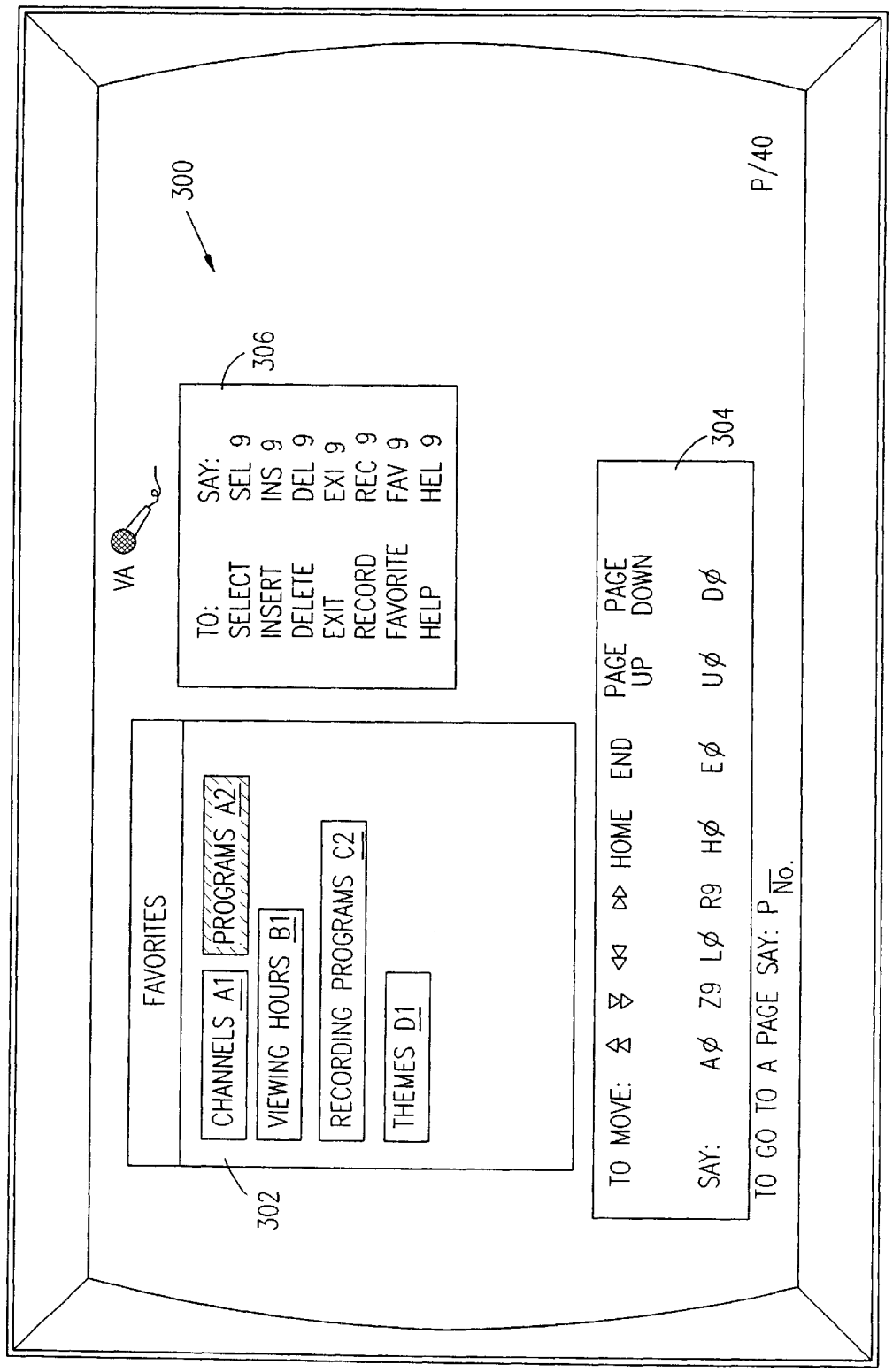

Referring now to FIG. 5D, an example of the favorites menu of FIG. 5A which may be selected from the main menu of FIG. 5A by saying "A3" followed by "SEL9" is illustrated. The favorites menu is a typical representation of an arrangement of a screen having pre-positioned non-ordered selection cells or areas, such that when the subscriber selects one of the selection areas on the screen information associated with the selected area is displayed. Preferably, such a selection may be performed by placing an indicator on the area to be selected.

FIG. 5D includes a favorites menu 300. Favorites menu 300 includes a sub-display 302 having a plurality of cells, each corresponding to a separate feature for which a favorite menu is required. Menu 300 may also include a table of instructions 304 and a table of instructions 306, which are similar to tables 254 and 256 of FIG. 5B respectively, and have similar functionality and structures.

In the configuration of sub-display 302, an individual selection combination which is used to address a cell may be displayed in the cell, adjacent to the name of the cell. When the subscriber says the combination which is displayed in the cell followed by the instruction "SEL9", the cell is selected, and the program guide passes to the respective favorite sub-menu.

Preferably, each such favorite sub-menu includes favorite data which is selected by the subscriber. The subscriber may insert or delete favorite data, and use features, such as recording, which operate on the favorite data by employing the commands in table 306.

In a preferred embodiment of the present invention, when the subscriber selects the channels cell, by saying "A1" followed by "SEL9", a sub-menu of pre-programmed favorite channels is displayed, and an indicator is placed on the first channel in the sub-menu.

When the subscriber selects the programs cell, by saying "A2" followed by "SEL9", a list of the favorite programs is displayed, together with the featuring dates and times. When the viewing hours cell is selected, by saying "B1" followed by "SEL9", programs featuring at the hours that the subscriber considers as favorite are displayed.

A selection of the recording programs cell, by saying "C2" followed by "SEL9", provides a display of a list of programs to be recorded, and selected hours for recording. This list may be in the form of a one-dimensional table format and selections therefrom are performed in the manner described herein above with reference to FIG. 5C.

When the subscriber selects the themes cell, by saying "D1" followed by "SEL9", a list of the favorite themes is displayed, together with the programs which match each favorite theme.

Figure 5E:
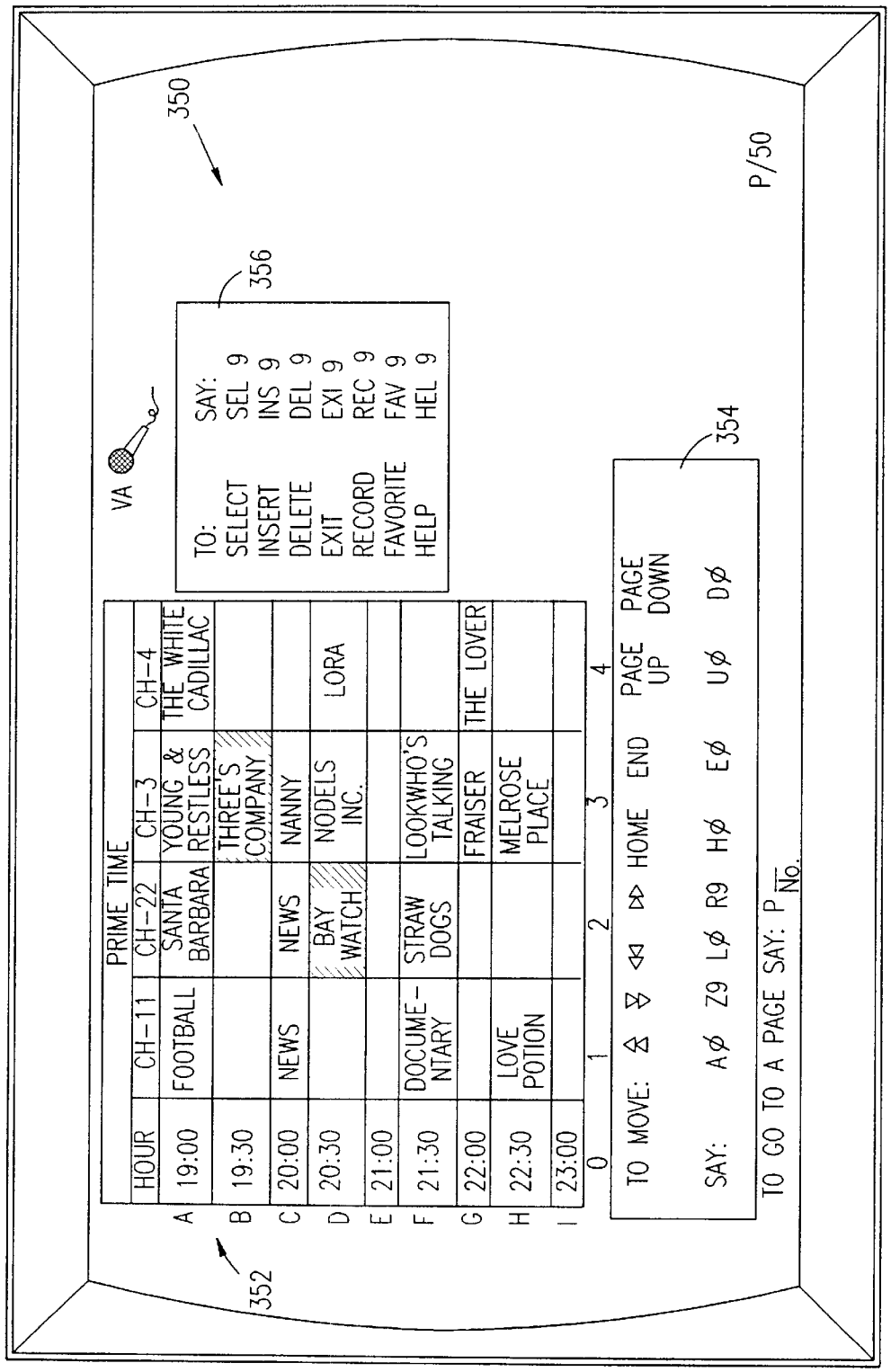

Referring now to FIG. 5E, an example of the prime time menu of FIG. 5A that may be selected from the main menu of FIG. 5A by saying "A4" followed by "SEL9" is illustrated. The prime time menu is another typical representation of an arrangement of a screen in a two-dimensional table format. Preferably, selections in such a menu may be performed in the manner described above with reference to FIGS. 5A and 5B.

In a preferred embodiment of the present invention a prime time menu 350 in FIG. 5E includes a two-dimensional table 352 with an ordered grid having identical cell sizes.

Preferably, table 352 displays programs and shows featuring at prime time hours at various channels. In the example of FIG. 5E, table 352 displays the programs that feature every day between 19:00 hours and 23:00 hours.

Prime time menu 350 may also include a table of instructions 354 and a table of instructions 356, which are similar to tables 254 and 256 of FIG. 5B respectively, and have similar functionality and structures thereof.

In a preferred embodiment of the present invention selections in table 352 are performed as mentioned above with reference to the two-dimensional tables in FIGS. 5A and 5B, i.e. by saying a character which indicates a row followed by a character which indicates a column, or vice versa, and by saying an instruction from table 356. Thus, by saying "D2" an indicator is placed on the program "Bay Watch" in table 352. If the selection of "Bay Watch" is followed by an instruction, such as "SEL9", the instruction is executed, and the program guide instructs the CATV converter to tune to the channel at which the program "Bay Watch" is featuring.

When the subscriber browses through the channels, such as by employing the PAGE UP and PAGE DOWN instructions in table 354, programs featuring at prime time hours in other channels are displayed. Preferably, a channel display cycle is repeated after displaying all available channels.

Figure 5F:
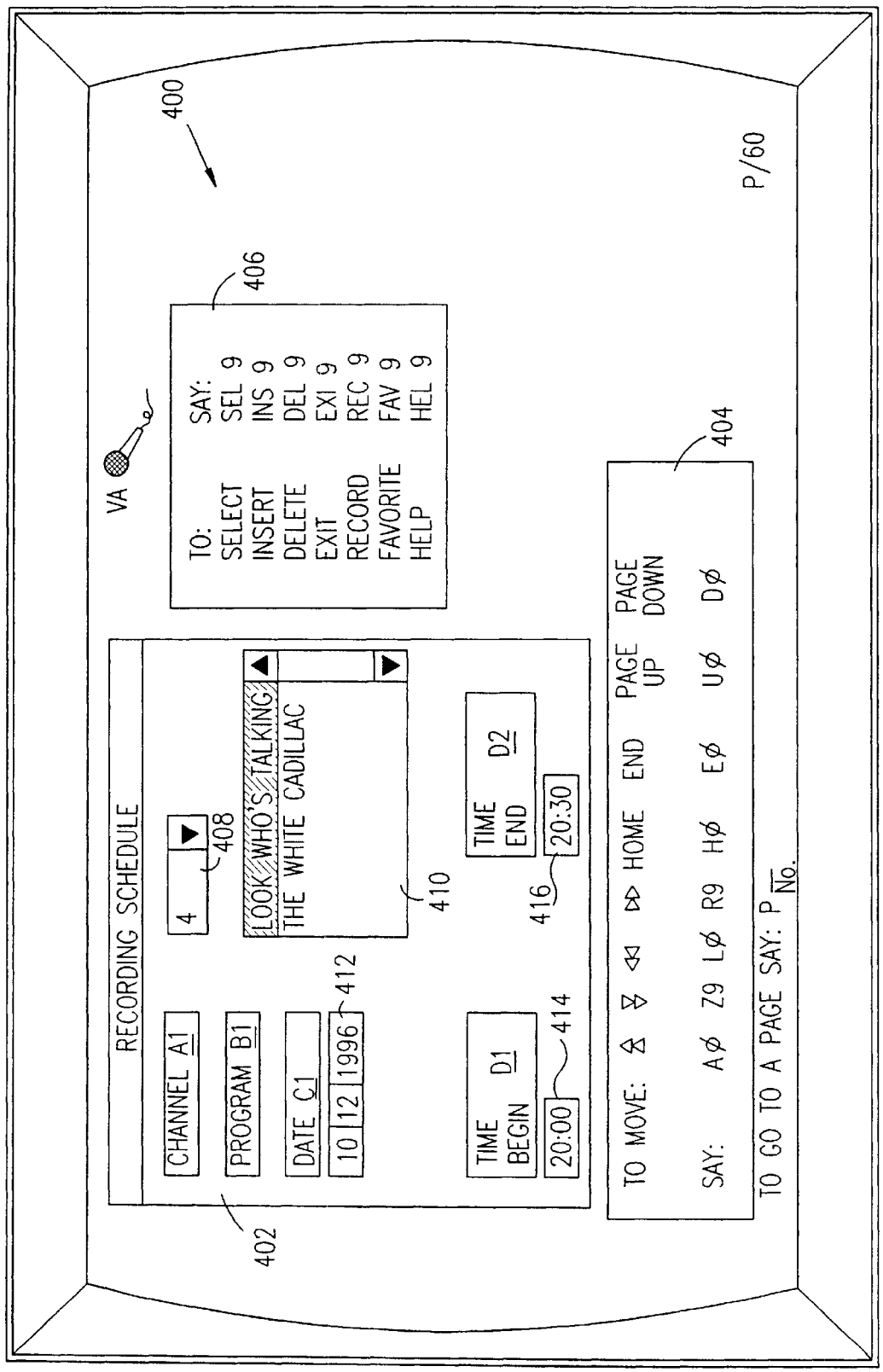

Referring now to FIG. 5F, the recording schedule menu of FIG. 5A that may be selected from the main menu of FIG. 5A by saying "B1" followed by "SEL9" is illustrated. The recording schedule menu, indicated as 400, is another typical representation of an arrangement of a screen having pre-positioned non-ordered selection areas.

In FIG. 5F, menu 400 includes a sub-display 402 having a plurality of cells, each corresponding to a recording parameter. In the configuration of sub-display 402, an individual selection combination which is used to address a cell may be displayed in the cell, adjacent to the name of the cell. When the subscriber says the combination which is displayed in the cell followed by the instruction "SEL9", the cell is selected, and the subscriber may change the corresponding recording parameter.

Menu 400 may also include a table of instructions 404 and a table of instructions 406, which are similar to tables 254 and 256 of FIG. 5B respectively, and have similar functionality and structures thereof.

As illustrated in FIG. 5F, the subscriber may select a channel and a program featuring at the channel for recording. When the subscriber says "A1" followed by "SEL9" a channel window 408 is opened, and a banner is placed on a first channel in a list of available channels in the system.

Preferably, the subscriber may browse through available channels by using "UP" and "DOWN" instructions from table 404 to move the banner up and down the channel window. The "UP" instruction may be executed by saying "A0", and the "DOWN" instruction may be executed by saying "Z9".

It is to be appreciated that a navigation instruction from table 404 is not to be followed by an execution instruction from table 406. Thus, for example, when the subscriber says "A0" an UP jump is executed immediately.

Preferably, the subscriber may also use the PAGE UP and PAGE DOWN instructions in table 404 in order to browse more quickly through the channels by jumping, forward or backward, a constant number of channels, such as 16 channels per jump.

When the subscriber browses through the channels, an indicator is moved so as to indicate a current channel in the channel window. When the indicator is placed on a requested channel, the subscriber may select the requested channel by saying "SEL9".

After a channel is selected, a program may be selected by saying "B1" followed by "SEL9". Then, a program window 410 is opened, and browsing through program banners may be performed in a similar way as browsing through channels, and by employing similar instructions.

In a preferred embodiment of the present invention selection of a recording date setup and recording time setup may be also performed in a similar way as the selection of a channel and a program. When the subscriber says "C1" followed by "SEL9" a date window 412 is opened and the subscriber may browse through date banners and select a recording date.

Preferably, an indicator may be placed on a first day digit. A requested day may be selected by using the "UP" and "DOWN" instructions from table 404 to browse through available digits for each digit which forms part of a representation of the day. When a required digit is displayed, the subscriber may select the required digit by saying "SEL9". To move to the next digits which form the date and of which setup is required, the subscriber may use the "LEFT" and "RIGHT" instructions in table 404 by saying "L0" and "R9" respectively.

A setup of a time to begin recording and a setup of a time to end recording may be selected by saying "D1" and "D2" respectively followed by "SEL9". When the setup of the time to begin recording is selected, a setup time window 414 is opened. When the setup of the time to end recording is selected, a setup time window 416 is opened.

Preferably, when one of the time windows 414 and 416 is selected, an indicator may be placed on a first hour digit. A requested time may be selected by using the "UP" and "DOWN" instructions from table 404 to browse through available digits for each digit which forms part of a representation of the time. When a required digit is displayed, the subscriber may select the required digit by saying "SEL9". To move to the next digits of the time for which setup is required, the subscriber may use the "LEFT" and "RIGHT" instructions in table 404 by saying "L0" and "R9" respectively.

In another preferred embodiment of the present invention a selection of a program to be recorded is sufficient to define a recording date and a recording time, since the program may be associated with the featuring date and time. Thus, selection of a date and a time may be obviated.

Figure 5G:
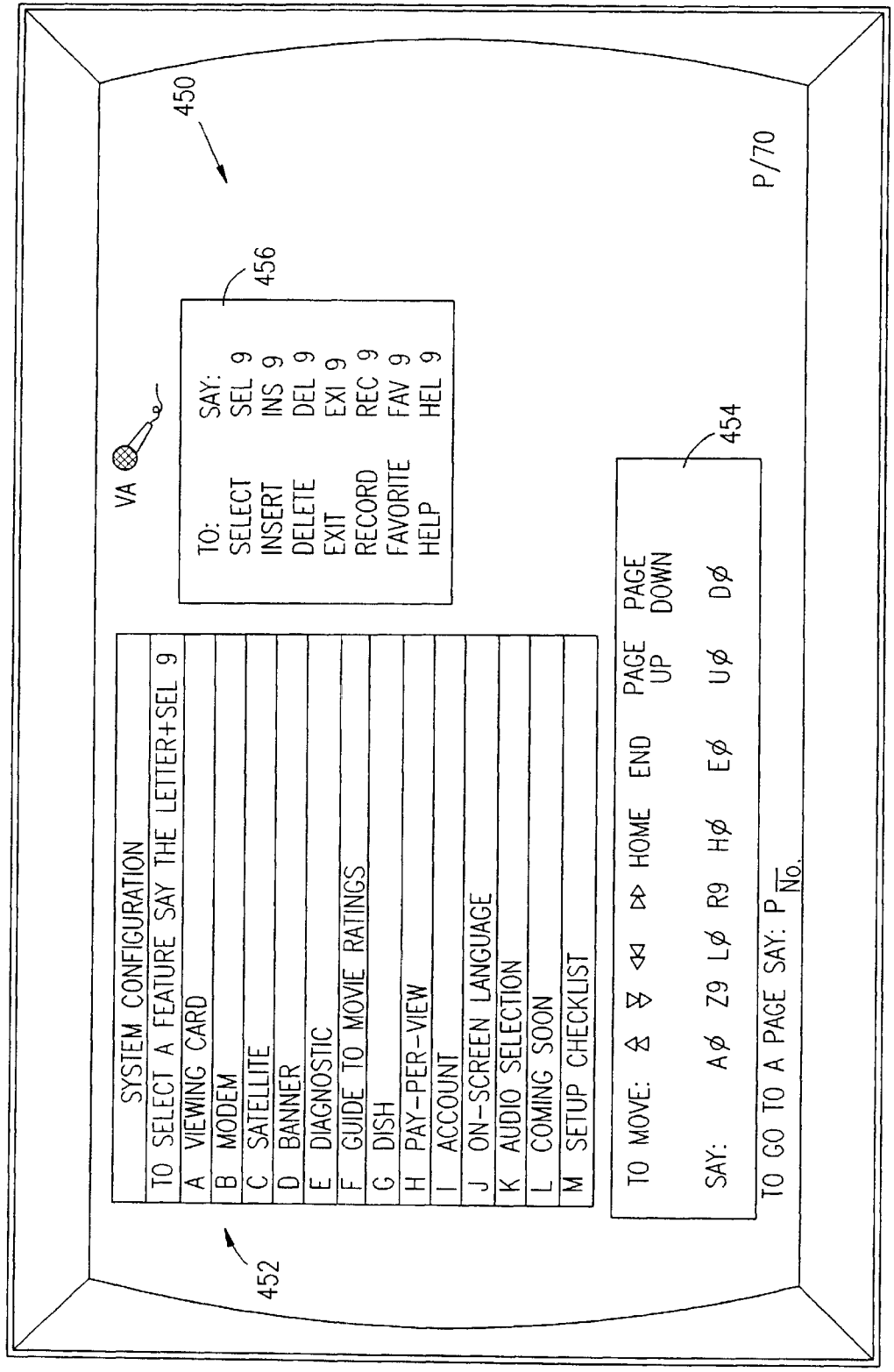
Figure 51:
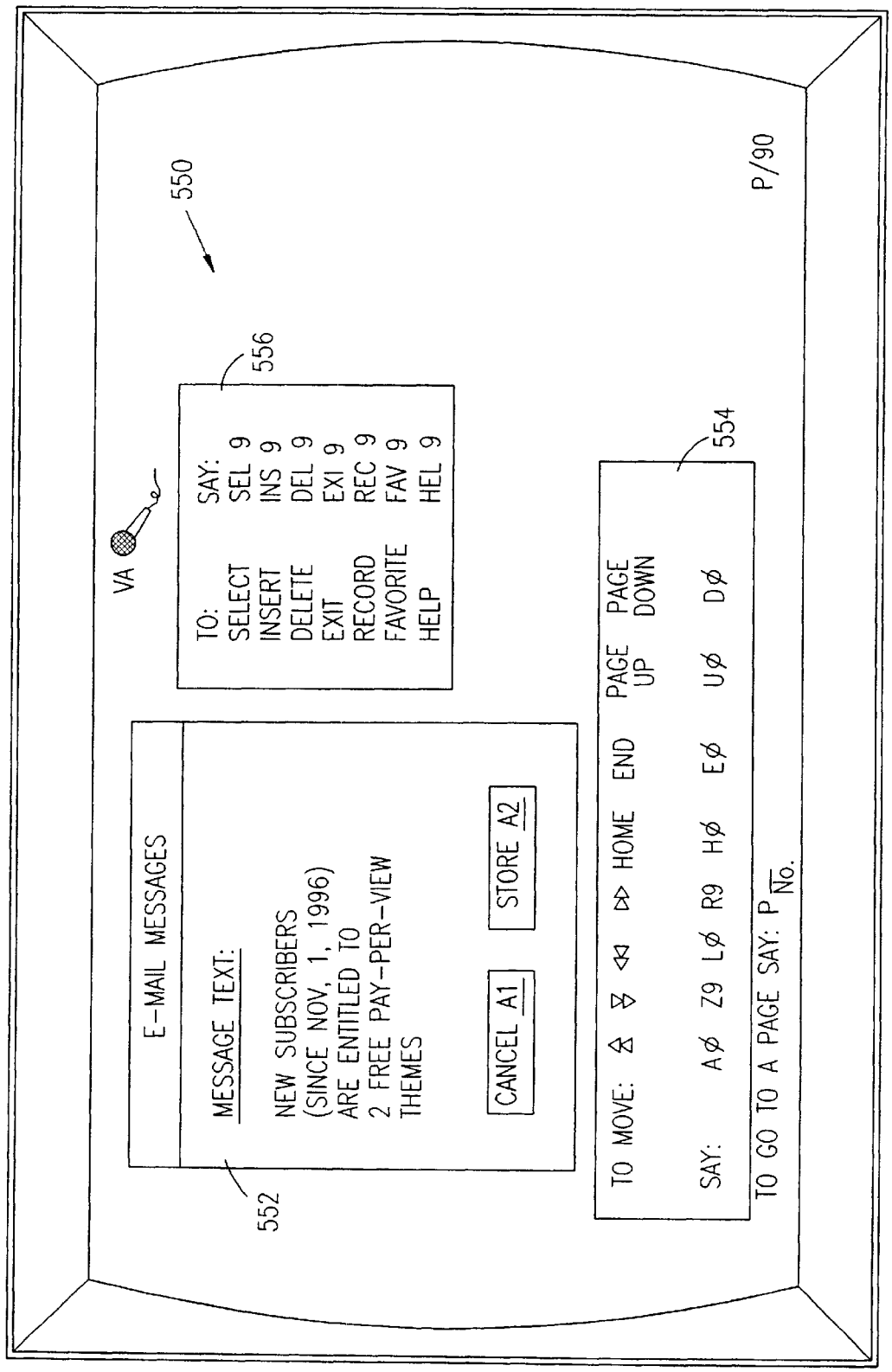

Referring now to FIG. 5G, an example of the system configuration menu of FIG. 5A that may be selected from the main menu of FIG. 5A by saying "B2" followed by "SEL9" is illustrated. The system configuration menu, indicated as 450, is another typical representation of an arrangement of a screen in a one-dimensional table format.

Preferably, system configuration menu 450 includes a one-dimensional table 452 having a list of features to be configured, and each feature is preferably identified by a letter character. Menu 450 may also include a table of instructions 454 and a table of instructions 456, which are similar to tables 254 and 256 of FIG. 5B respectively, and have similar functionality and structures thereof.

In a preferred embodiment of the present invention a feature in table 452 may be selected by saying the letter character which identifies the requested feature, followed by the voice instruction "SEL9" from table 456 for executing the selection. Preferably, when the subscriber says the letter character which identifies a feature, such as the letter character "E", an indicator is placed on the corresponding feature, i.e. on the "diagnostic" feature. Then, if the subscriber says "SEL9", menu 450 disappears and the program guide displays a diagnostic sub-display (not shown) in which the subscriber may view and change diagnostic parameters.

Referring now to FIG. 5H, an example of the parental control menu of FIG. 5A that may be selected from the main menu of FIG. 5A by saying "B3" followed by "SEL9" is illustrated. The parental control menu, indicated as 500, is another typical representation of an arrangement of a screen having pre-positioned non-ordered selection areas.

Parental control menu 500 may include a sub-display 502 having a plurality of cells, each corresponding to a separate a parental control sub-menu. Menu 500 may also include a table of instructions 504 and a table of instructions 506, which are similar to tables 254 and 256 of FIG. 5B respectively, and have similar functionality and structures thereof.

In the configuration of sub-display 502, an individual selection combination which is used to address a cell may be displayed in the cell, adjacent to the name of the cell. When the subscriber says the combination which is displayed in the cell, followed by the instruction "SEL9" from table 506, the cell is selected, and the program guide passes to the respective parental control sub-menu.

In a preferred embodiment of the present invention, when the subscriber selects the information cell, by saying "A1" followed by "SEL9", a sub-menu (not shown) may be displayed in which the subscriber may view information regarding the parental control options of the program guide and the system.

When the subscriber selects the key lock cell, by saying "B1" followed by "SEL9", a key lock sub-menu (not shown) may be displayed and the subscriber may select an access key for programs rated for adults only. Preferably, the subscriber may also enter key locks to lock programs in order to prevent children from viewing programs rated for adults only.

When the list of programs cell is selected, by saying "C1" followed by "SEL9", a list of the programs and their ratings is displayed.

A selection of the authorized programs cell, by saying "D1" followed by "SEL9", provides a display of a list of programs which are authorized to view by any member of the subscriber's family. This list, as well as the list of program ratings, may be in the form of a one-dimensional table format and selections therefrom are performed in the manner described herein above with reference to FIG. 5C.

When the subscriber selects the list of channels cell, by saying "E1" followed by "SEL9", a list of channels which are rated for adults only, or for specific usage such as video-conference, is displayed. This list may also be in the form of a one-dimensional table format and selections therefrom are performed in the manner described herein above with reference to FIG. 5C.

Referring now to FIG. 5I, an example of the E-mail menu of FIG. 5A that may be selected from the main menu of FIG. 5A by saying "B4" followed by "SEL9" is illustrated. The E-mail menu, indicated as 550, is another typical representation of an arrangement of a screen having pre-positioned non-ordered selection areas.

E-mail menu 500 may include a sub-display 552 having a plurality of pre-positioned cells. Menu 550 may also include a table of instructions 554 and a table of instructions 556, which are similar to tables 254 and 256 of FIG. 5B respectively, and have similar functionality and structures thereof.

In the configuration of sub-display 552, an individual selection combination which is used to address a cell may be displayed in the cell, adjacent to the name of the cell. When the subscriber says the combination which is displayed in the cell, followed by the instruction "SEL9" from table 556, the cell is selected, and the respective command is executed.

In a preferred embodiment of the present invention an E-mail message, originated from a headend via a modem of the CATV converter or via cable, may be displayed in sub-display 552, and the subscriber may browse through various messages by using the PAGE UP and the PAGE DOWN instructions from table 554. Preferably, the subscriber may also cancel a message by saying "A1" followed by "SEL9", or store a message by saying "A2" followed by "SEL9".

It is to be appreciated that the code combinations described with reference to FIGS. 5A–5I may be employed to distinguish the requested voice commands from natural speech which is spoken in a conversation or played on the television during featuring of a regular program. However, many other combinations may be employed without departing from the spirit of the invention. Such combinations may include other letter characters and other number characters, and other combinations, such "SE0" for SELECT, "A1" for UP, etc. which may also be employed to distinguish the voice commands from natural speech.

In another preferred embodiment of the invention conventional natural speech may be employed for selection, and the special instruction code combinations as mentioned herein above with reference to FIGS. 5A–5I may be used for execution of the selections. Thus, even if a natural selection word is spoken in a conversation, a selection is not executed if the special execution combination does not follow the natural selection word. Preferably, the natural speech may include words, phrases and sentences such as "ORDER BAY WATCH", or "I WANT TO WATCH CHANNEL 4".

Alternatively, the special selection code combinations, as mentioned herein above with reference to FIGS. 5A–5I, may be used for selections, and natural command words, such as "GO" and "SELECT" may be used for instructions. Such a combination assures performance of legitimate commands only.

In another preferred embodiment of the present invention the subscriber may generate his own vocabulary for selections and commands. The vocabulary may include favorite words, such as names of people, funny words, etc. Preferably, the vocabulary generated by the subscriber may be recorded and analyzed in a voice recognition unit in the CATV converter and stored in a memory in the CATV converter as mentioned above with reference to FIGS. 2 and 3.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable sub-combination.

It will be appreciated by persons skilled in the art that the present invention is not limited by what has been particularly shown and described hereinabove. Rather the scope of the present invention is defined by the claims which follow:

What is claimed is:

1. A program guide selection system comprising:
   a communication network for communicating program guide information which includes operating characteristics of a communication system and selection codes associated with the operating characteristics of the communication system; and
   a multiplicity of subscriber units, each including:
      a receiver for receiving the program guide information and the selection codes associated with the operating characteristics;
      a microphone employed by a subscriber for oral input of a selection code, the selection code being associated with a requested one of the operating characteristics of the communication system;
      a camera operative to take a picture of the subscriber when located in a field of view of the camera;
      a processor operative to associate speech characteristics of each of a multiplicity of speakers with images of each of the multiplicity of speakers;
      an image processor operatively associated with the camera and the processor and operative to compare the picture of the subscriber to at least one of the images of each of the multiplicity of speakers and to determine whether the picture of the subscriber is substantially similar to an image of a speaker; and
      a speech recognition unit operatively associated with the microphone and the processor and customized to respond to the selection code inputted orally by the subscriber and to enable selection of the requested one of the operating characteristics of the communication system associated with the selection code upon a determination that the picture of the subscriber is substantially similar to the image of the speaker, and that speech characteristics of the subscriber substantially match speech characteristics associated with the speaker.

2. The system according to claim 1 and wherein each of said selection codes includes at least one of the following: a letter character; a number character; and a combination of letter and number characters.

3. A subscriber unit for use with a program guide selection system in which program guide information, which includes operating characteristics of a communication system, is communicated over a communication network, the subscriber unit comprising:
   a receiver for receiving the program guide information and the operating characteristics of the communication system;

a microphone employed by a subscriber for oral input of a selection code, the selection code being associated with a requested one of the operating characteristics of the communication system;

a camera operative to take a picture of the subscriber when located in a field of view of the camera;

a processor operative to associate speech characteristics of each of a multiplicity of speakers with images of each of the multiplicity of speakers;

an image processor operatively associated with the camera and the processor and operative to compare the picture of the subscriber to at least one of the images of each of the multiplicity of speakers and to determine whether the picture of the subscriber is substantially similar to an image of a speaker; and a speech recognition unit operatively associated with the microphone and the processor and customized to respond to the selection code inputted orally by the subscriber and to enable selection of the requested one of the operating characteristics of the communication system associated with the selection code upon a determination that the picture of the subscriber is substantially similar to the image of the speaker, and that speech characteristics of the subscriber substantially match speech characteristics associated with the speaker.

4. Apparatus according to claim 3 and also comprising a memory which communicates with at least one of the following: said processor; said speech recognition unit; and said image processor, wherein said memory is operative to store at least one of the following: said speech characteristics of each of the multiplicity of speakers; and said images of each of the multiplicity of speakers.

5. Apparatus according to claim 4 and wherein:

said memory comprises a removable external memory module;

said subscriber unit includes an external memory reader; and said removable external memory module, when placed in operative association with said external memory reader, is operative to communicate, via said external memory reader, with at least one of the following: said processor; said speech recognition unit; and said image processor.

6. Apparatus according to claim 4 and also comprising a compressor/decompressor operative to compress at least one of:

said speech characteristics of each of the multiplicity of speakers; and said images of each of said multiplicity of speakers, prior to storage in said memory, and to decompress at least one of:

said speech characteristics of each of the multiplicity of speakers; and said images of each of the multiplicity of speakers, upon retrieval from said memory.

7. Apparatus according to claim 3 and wherein:

said speech recognition unit comprises an external removable speech recognition module;

said subscriber unit also includes an interface unit; and said external removable speech recognition module, when placed in operative association with said interface unit, is operative to enable selection of said requested one of the operating characteristics via said interface unit.

8. Apparatus according to claim 3 and also comprising an on-screen-display (OSD) unit operative to generate on-screen messages for display on a display in response to instructions provided by at least one of the following: said speech recognition unit; and said processor.

9. Apparatus according to claim 3 and also comprising a decrypter operative to decrypt encrypted incoming information in response to an authorization signal provided by at least one of the following: said speech recognition unit; and said processor.

10. Apparatus according to claim 3 and wherein:

said program guide information also comprises selection codes which are associated with the operating characteristics of the communication system;

said receiver is operative to receive said selection codes and to provide said selection codes to a display; and the selection code, inputted orally by the subscriber, is selected from among said selection codes.

11. Apparatus according to claim 3 and also comprising a memory for storing at least one of:

selection codes which enable selections from the operating characteristics;

the speech characteristics of each of the multiplicity of speakers; and the images of each of the multiplicity of speakers, wherein the processor is operative to associate the selection codes with the operating characteristics, and the selection code, inputted orally by the subscriber, is selected from among said selection codes.

12. Apparatus according to claim 3 and wherein said requested one of the operating characteristics comprises at least one of the following: a program selection; a system configuration; a parental control parameter; a message; program guide scheduling; and a selection of a channel.

13. A voice selection method for a user to select a requested one of operating characteristics of a program guide selection communication system from among a plurality of operating characteristics of the system which are displayed on a display, the method comprising:

providing a speech recognition unit which is operative to respond to speech from a multiplicity of speakers;

storing speech characteristics of each of the multiplicity of speakers;

associating the speech characteristics of each of the multiplicity of speakers with images of each of the multiplicity of speakers;

providing a camera which is operative to take a picture of the user when located in a field of view of the camera;

comparing the picture of the user to at least one of the images of the multiplicity of speakers;

determining that the picture of the user is substantially similar to an image of a speaker; and executing a voice command, when the voice command is provided by the user and is associated with the requested one of operating characteristics, in response to said determining step and in accordance with a determination that speech characteristics of the user substantially match speech characteristics associated with the speaker.

14. The method according to claim 13 and wherein said executing step includes:

detecting the voice command provided by the user;

verifying that the voice command is a legitimate command associated with a selection of the requested one of operating characteristics; and selecting said requested one of operating characteristics in response to said verifying step.

15. The method according to claim 13 and wherein said requested one of operating characteristics comprises at least one of the following: a program selection; a system configuration; a parental control parameter; a message; program guide scheduling; and a selection of a channel.

16. A voice selection method for enabling a user to select a requested one of operating characteristics of a program guide selection communication system from among a plurality of operating characteristics of the system which are displayed on a display, the method comprising:

receiving the plurality of operating characteristics;

associating the plurality of operating characteristics with selection codes which enable selections from the plurality of operating characteristics;

displaying the plurality of operating characteristics and the selection codes associated therewith;

storing speech characteristics of each of a multiplicity of speakers, and images of each of the multiplicity of speakers;

associating the speech characteristics of each of the multiplicity of speakers with the images of each of the multiplicity of speakers;

taking a picture of the user when located in a field of view of a camera;

identifying, on the display, a requested selection code which corresponds to the requested one of operating characteristics;

accepting, at a microphone, an oral input of a voice expression; and selecting said requested one of operating characteristics associated with the selection code in response to coexistence of the following:
a determination that the picture of the user is substantially similar to an image of one of the multiplicity of speakers;
a determination that speech characteristics associated with said oral input of the voice expression substantially include an oral input of the requested selection code; and
a determination that the speech characteristics associated with the oral input of said voice expression substantially match the speech characteristics associated with the user.

17. The method according to claim 16 and wherein each of said selection codes includes at least one of the following: a letter character; a number character; and a combination of letter and number characters.

18. The method according to claim 16 and wherein each of said selection codes includes at least one of the following: a word; a phrase; and a sentence.

19. A subscriber unit for use with a program guide selection system in which program guide information, which includes operating characteristics of a communication system, is communicated over a communication network, the subscriber unit comprising:

receiving means for receiving the program guide information and the operating characteristics of the communication system;

means, to be employed by a subscriber, for oral input of a selection code, the selection code being associated with a requested one of the operating characteristics of the communication system;

means for taking a picture of the subscriber when located in a field of view of the camera;

processing means for associating speech characteristics of each of a multiplicity of speakers with images of each of the multiplicity of speakers;

comparing means for comparing the picture of the subscriber to at least one of the images of each of the multiplicity of speakers and for determining whether the picture of the subscriber is substantially similar to an image of a speaker; and speech responsive means for responding to the selection code inputted orally by the subscriber and for enabling selection of the requested one of the operating characteristics of the communication system associated with the selection code upon a determination that the picture of the subscriber is substantially similar to the image of the speaker, and that speech characteristics of the subscriber substantially match speech characteristics associated with the speaker.

20. Apparatus according to claim 19 and also comprising storage means for storing at least one of the following: said speech characteristics of each of the multiplicity of speakers; and said images of each of the multiplicity of speakers.

21. Apparatus according to claim 20 and wherein:

said storage means comprise removable external storage means;

said subscriber unit includes access means for accessing said removable external storage means; and said removable external storage means, when placed in operative association with said access means, are operative to communicate, via said access means, with at least one of the following: said processing means; said speech responsive means; and said comparing means.

22. Apparatus according to claim 20 and also comprising compressing/decompressing means for compressing at least one of:

said speech characteristics of each of the multiplicity of speakers; and said images of each of said multiplicity of speakers, prior to storage in said storage means, and for decompressing at least one of:
said speech characteristics of each of the multiplicity of speakers; and
said images of each of the multiplicity of speakers, upon retrieval from said storage means.

23. Apparatus according to claim 19 and wherein:

said speech responsive means comprise external removable speech responsive means;

said subscriber unit also includes interfacing means for accessing said external removable speech responsive means; and said external removable speech responsive means, when placed in operative association with said interfacing means, are operative to enable selection of said requested one of the operating characteristics via said interfacing means.

24. Apparatus according to claim 19 and also comprising on-screen displaying means for generating on-screen messages for display on a display in response to instructions provided by at least one of the following: said speech responsive means; and said processing means.

25. Apparatus according to claim 19 and also comprising decrypting means for decrypting encrypted incoming information in response to an authorization signal provided by at least one of the following: said speech responsive means; and said processing means.

26. Apparatus according to claim 19 and wherein:
said program guide information also comprises selection codes which are associated with the operating characteristics of the communication system;
said receiving means receive said selection codes and provide said selection codes to a display; and
the selection code, inputted orally by the subscriber, is selected from among said selection codes.

27. Apparatus according to claim 19 and also comprising storage means for storing at least one of:
selection codes which enable selections from the operating characteristics;
the speech characteristics of each of the multiplicity of speakers; and
the images of each of the multiplicity of speakers, wherein the processing means associate the selection codes with the operating characteristics, and
the selection code, inputted orally by the subscriber, is selected from among said selection codes.

28. A subscriber unit for use with a program guide selection system in which program guide information, which includes operating characteristics of a communication system, is communicated over a communication network, the subscriber unit comprising:
a receiver for receiving the program guide information and the operating characteristics of the communication system;
a microphone employed by a subscriber for oral input of a selection code;
a camera operative to take a picture of the subscriber when located in a field of view of the camera;
a processor operative to associate speech characteristics of each of a multiplicity of speakers with images of each of the multiplicity of speakers;
an image processor operatively associated with the camera and the processor and operative to compare the picture of the subscriber to at least one of the images of each of the multiplicity of speakers and to determine whether the picture of the subscriber is substantially similar to an image of a speaker; and
a speech recognition unit operatively associated with the microphone and the processor and responding to the selection code when orally inputted by any of the multiplicity of speakers, the speech recognition unit being customized to respond only to the selection code inputted orally by the subscriber and to enable selection of a requested one of the operating characteristics of the communication system associated with the selection code upon a determination that the following coexist:
the picture of the subscriber orally inputting the selection code is substantially similar to the image of the speaker;
speech characteristics of the subscriber orally inputting the selection code substantially match speech characteristics associated with the speaker; and
the selection code orally inputted by the subscriber is a legitimate selection code associated with the requested one of the operating characteristics of the communication system.

29. A selection method for exclusively selecting a user whose oral input of a voice command for selecting a requested one of operating characteristics of a program guide selection communication system from among a plurality of operating characteristics of the system which are displayed on a display will be executed, the method comprising:
providing a speech recognition unit which is operative to recognize speech characteristics of a multiplicity of speakers from which the user is selected so that an oral expression of the voice command by any one of the multiplicity of speakers is recognizable by the speech recognition unit;
associating the speech characteristics of each of the multiplicity of speakers with images of each of the multiplicity of speakers; and
selecting the user as the exclusive speaker whose oral input of the voice command will be executed if the following are simultaneously satisfied:
a picture of the user taken by a camera when the user orally inputs the voice command is substantially similar to an image of one of the multiplicity of speakers;
speech characteristics of the user orally inputting the voice command substantially match speech characteristics associated with said one of the multiplicity of speakers; and
the voice command orally inputted by the user is a legitimate voice command associated with the requested one of the operating characteristics of the communication system.

30. A method for executing an orally inputted command for selecting a requested one of operating characteristics of a program guide selection communication system from among a plurality of operating characteristics of the system which are displayed on a display, the orally inputted command being recognizable by a speech recognition unit whenever any one of a plurality of speakers expresses orally the command, the method comprising:
detecting the orally inputted command;
verifying that the following are simultaneously satisfied:
speech characteristics determined from the orally inputted command substantially match speech characteristics associated with one of the plurality of speakers;
a picture of a user which is taken by a camera when the orally inputted command is detected substantially matches an image of said one of the plurality of speakers; and
the command is a legitimate command associated with the requested one of the operating characteristics of the communication system;
determining, in response to a positive result of said verifying step, that the command was expressed by the user and is to be executed; and
executing the command in response to said determining step.

31. A voice-activated subscriber unit of a communication system in which an orally inputted command for selecting a requested one of operating characteristics of the program guide selection communication system from among a plurality of operating characteristics of the system which are displayed on a display is executed, the subscriber unit comprising:
a speech recognition unit operative to detect the orally inputted command, the orally inputted command being recognizable by the speech recognition unit whenever any one of a plurality of speakers expresses orally the command;
a camera; and a processor operatively associated with the speech recognition unit and the camera and operative to generate a verification that the following are simultaneously satisfied:

speech characteristics determined by the speech recognition unit from the orally inputted command substantially match speech characteristics associated with one of the plurality of speakers;

a picture of a user taken by the camera when the orally inputted command is detected substantially matches an image of said one of the plurality of speakers; and the command is a legitimate command associated with the requested one of the operating characteristics of the communication system, wherein the processor is further operative to generate a determination in response to said verification that the command was expressed by the user and is to be executed, and the voice recognition unit is further operative to execute the command in response to said determination.

* * * * *